United States Patent
Kennedy et al.

(10) Patent No.: US 10,276,321 B2
(45) Date of Patent: Apr. 30, 2019

(54) DYNAMIC COORDINATION OF PROTECTION DEVICES IN ELECTRICAL DISTRIBUTION SYSTEMS

(71) Applicant: Atom Power, LLC, Charlotte, NC (US)

(72) Inventors: Ryan Kennedy, Charlotte, NC (US); Denis Kouroussis, Markham (CA)

(73) Assignee: Atom Power, Inc., Charlotte, NC (US)

( * ) Notice: Subject to any disclaimer, the term of this patent is extended or adjusted under 35 U.S.C. 154(b) by 412 days.

(21) Appl. No.: 15/076,304

(22) Filed: Mar. 21, 2016

(65) Prior Publication Data
US 2016/0294179 A1 Oct. 6, 2016

Related U.S. Application Data

(60) Provisional application No. 62/143,299, filed on Apr. 6, 2015, provisional application No. 62/301,948, filed on Mar. 1, 2016.

(51) Int. Cl.
*H01H 9/54* (2006.01)
*H02H 3/00* (2006.01)
(Continued)

(52) U.S. Cl.
CPC .............. *H01H 9/54* (2013.01); *H02H 7/261* (2013.01); *H02H 7/30* (2013.01);
(Continued)

(58) Field of Classification Search
CPC .......... G05B 2219/25004; H01H 9/54; H02H 3/006; H02H 3/033; H02H 7/261; H02H 7/30
See application file for complete search history.

(56) References Cited

U.S. PATENT DOCUMENTS 4,245,318 A * 1/1981 Eckart ............... G01R 31/3277
361/63
5,367,427 A * 11/1994 Matsko ............... G05B 19/108
361/94
(Continued)

OTHER PUBLICATIONS

Mar. 7, 2018 Office Action, U.S. Appl. No. 29/555,717.
(Continued)

*Primary Examiner* — Jennifer L Norton
(74) *Attorney, Agent, or Firm* — Patent Law Professionals, P.C.; William E. Winters

(57) ABSTRACT

A dynamically coordinatable electrical distribution system includes a plurality of intelligently-controlled protection devices (PDs), a communication and control bus (comm/control) bus, and a central computer. The plurality of intelligently-controlled PDs is configured to protect a plurality of associated electrical loads from faults, developing faults, and other undesired electrical anomalies. Each of the PDs further has electrically adjustable time-current characteristics. The intelligently-controlled PDs are communicatively coupled to the comm/control bus and configured to report current data representative of real-time currents flowing through their respective loads to the central computer, via the comm/control bus. The central computer is configured to communicate with the plurality of PDs over the comm/control bus and dynamically coordinate the time-current characteristics of the plurality of PDs based on the current data it receives from the PDs.

3 Claims, 24 Drawing Sheets

(51) Int. Cl.
*H02H 7/30* (2006.01)
*H02H 3/033* (2006.01)
*H02H 7/26* (2006.01)

(52) U.S. Cl.
CPC ... *G05B 2219/25004* (2013.01); *H02H 3/006* (2013.01); *H02H 3/033* (2013.01)

(56) References Cited

U.S. PATENT DOCUMENTS

| | | | | |
|---|---|---|---|---|
| 5,404,904 | A * | 4/1995 | Glaser | F16K 17/06 137/539 |
| 5,872,722 | A * | 2/1999 | Oravetz | H02H 3/006 345/440 |
| 6,167,329 | A * | 12/2000 | Engel | H02H 7/261 361/93.2 |
| 6,292,717 | B1 * | 9/2001 | Alexander | G01R 19/2513 340/6.1 |
| 6,535,797 | B1 * | 3/2003 | Bowles | H02J 3/00 700/286 |
| 6,788,512 | B2 * | 9/2004 | Vicente | H02H 3/006 361/93.1 |
| 8,874,277 | B2 | 10/2014 | Kouroussis et al. | |
| 9,287,065 | B1 | 3/2016 | Davis et al. | |
| 9,964,982 | B1 * | 5/2018 | Nguyen | G05F 1/66 |
| 2002/0010518 | A1 * | 1/2002 | Reid | G06Q 10/087 700/31 |
| 2006/0116794 | A1 * | 6/2006 | Stoupis | H02J 13/001 700/286 |
| 2007/0055889 | A1 * | 3/2007 | Henneberry | G01R 19/2513 713/186 |
| 2011/0066301 | A1 * | 3/2011 | Donolo | H02J 3/12 700/292 |
| 2013/0066478 | A1 * | 3/2013 | Smith | H02H 3/006 700/293 |
| 2013/0253898 | A1 * | 9/2013 | Meagher | G06F 17/5009 703/18 |
| 2015/0019038 | A1 | 1/2015 | Kouroussis et al. | |
| 2016/0276116 | A1 * | 9/2016 | Pignier | H01H 9/54 |
| 2017/0004948 | A1 | 1/2017 | Leyh | |
| 2018/0277317 | A1 * | 9/2018 | Kennedy | H01H 9/54 |
| 2018/0301294 | A1 * | 10/2018 | Kennedy | H01H 9/54 |
| 2019/0041887 | A1 * | 2/2019 | Forbes, Jr. | H02J 3/14 |

OTHER PUBLICATIONS

"Function and rated characteristic of circuit breaker—all things need to know of circuit breaker," dated; Nov. 20, 2013, accessed online on Apr. 25, 2018 at: http://eblogbd.com/details-characteristics-circuit-breaker/.

"Eaton's New Narrow Frame Power and Air Circuit Breaker Offers Reduced Size and Improved Safety," dated: Jun. 23, 2009, accessed online on Apr. 25, 2018 at: http://www.eaton.com/Eaton/OurCompany/newsevents/newsreleases/CT_238199.

* cited by examiner

DYNAMIC COORDINATION OF PROTECTION DEVICES IN ELECTRICAL DISTRIBUTION SYSTEMS

CROSS-REFERENCE TO RELATED APPLICATIONS

This application claims the benefit of U.S. Provisional Patent Application No. 62/143,299, filed on Apr. 6, 2015 and U.S. Provisional Patent Application No. 62/301,948, filed on Mar. 1, 2016, both of which are incorporated herein by reference.

FIELD OF THE INVENTION

The present invention relates to electrical distribution systems, protection devices used in electrical distribution systems, and methods and apparatus for dynamically coordinating time-current characteristics of protections devices in electrical distribution systems.

BACKGROUND OF THE INVENTION

Electrical distribution systems distribute electrical power from an electrical power transmission system to electrical power consumers. To protect and isolate electrical loads from abnormal operating conditions and allow electricians and engineers to safely work on and maintain an electrical distribution system, circuit breakers are deployed at various stages in the distribution system. For example, circuit breakers comprise part of the switchgear that is installed within power distribution stations and substations and are installed in panelboards at or near service drops of commercial buildings and residences.

A principal function of a circuit breaker is to protect its load and the electrical conductors in the load circuit from overcurrent conditions. In general, there are two types of overcurrent conditions: an "overload" and a "fault." The National Electrical Code (NEC) defines an "overload" as: "operation of equipment in excess of normal, full-load rating, or a conductor in excess of rated ampacity that when it persists for a sufficient length of time, would cause damage or dangerous overheating." A "fault" is defined as "an electrical connection, which is made unintentionally, resulting in an excessive amount of overcurrent." Faults typically produce much higher currents than do overloads, depending on the fault impedance. A fault with no impedance is referred to as a "short circuit" or a "bolted fault."

FIG. 1 is a simplified one-line drawing of a typical electrical distribution system 100, illustrating how conventional circuit breakers are deployed in the distribution system. Alternating current (AC) power supplied from the secondary winding of a step-down transformer 102 is connected to a first set of circuit breakers within a main distribution panel (MDP) 104. The first set of circuit breakers in the MDP 104 includes a main circuit breaker, which provides short-circuit and overload protection to all downstream loads in the system. The remaining circuit breakers in the MDP 104 serve to provide fault and overload protection to loads that are either directly connected to the MDP 104, such as motor load 106, or to one or more sub-panelboards 108, which include "downstream" circuit breakers (and possibly other sub-panelboards) that provide fault and overload protection to additional loads, such as motor load 110 and light load 112.

Conventional circuit breakers have been in widespread use for many years. However, there are various challenges and drawbacks relating to their use. One problem relates to the precision, both in terms of time and current, at which they are capable of responding to faults and other overcurrent conditions and the uncertainty that results due to their lack of precision. Conventional circuit breakers are electromechanical in nature and typically use some sort of spring mechanism to control whether line current is allowed to flow into their load circuits. Unfortunately, due to limitations on the magnetics and mechanical design involved, the time it takes, and the current level at which, a conventional circuit breaker trips in response to a fault can vary, even for a circuit breaker that is selected from a group of breakers having the same type and rating, and even among several circuit breakers of the same type and rating provided by the same manufacturer. The time-current precision of a conventional circuit breaker also tends to degrade and deviate over time, due to aging of its electromechanical components. Because of this variability, circuit breaker manufactures will often provide time-current characteristic data for each type and rating of circuit breaker that they manufacture. The time-current characteristic data of the circuit breaker is typically displayed in a two-dimensional logarithmic plot, such as illustrated in FIG. 2, with current on the horizontal axis, time on the vertical axis, and "tripped" and "not tripped" regions separated by an uncertainty band within which the trip status of the circuit breaker is uncertain.

In an effort to address the time-current uncertainties of conventional circuit breakers, electricians and engineers will often perform what is known as a "selective coordination study" when designing an electrical distribution system. The selective coordination study is usually performed prior to the electrical distribution system being constructed. The goal of the selective coordination study is to select and map circuit breakers in the distribution system design so that only the closest circuit breaker upstream from a fault or overload condition will trip in response to a fault or overload condition. A successful selective coordination study will help to ensure that only those sections of the electrical distribution system that are downstream from the source of the fault or overload condition are isolated and de-energized, allowing the remaining upstream sections of the distribution system to continue operating, despite the fault or overload condition.

A selective coordination study is performed taking into consideration the time-current characteristic data provided by the circuit breaker manufacturers. During the study, circuit breakers of different types and amperage ratings are selected and mapped into the design with the goal of preventing the uncertainty bands of the various circuit breakers from overlapping. Overlapping bands is undesirable since it provides an indication that one or more upstream circuit breakers may unwantedly or prematurely trip in response to a fault or overload condition, instead of a downstream breaker that is closer to the source of the fault or overload condition and which could otherwise fully isolate the fault or overload condition on its own.

There are software tools available in the prior art that display the uncertainty bands of the various mapped circuit breakers and which can assist electricians and engineers in performing selective coordination studies. Unfortunately, due to the uncertainty bands present in the time-current characteristics of the various mapped circuit breakers, the electrician or engineer will often determine that it is not possible to prevent one or more of the uncertainty bands from overlapping, as illustrated in FIG. 3. In order to address this problem, the circuit breakers must be rearranged and/or replaced with circuit breakers of different types and/or ratings.

Not only are selective coordination studies cumbersome to perform and time-consuming, they are also prone to error, particularly since human interpretation is involved. For example, when electrical generators and induction motors are part of the system design, assumptions must be made as to how current from such loads might possibly be injected into a fault when a fault occurs. Those assumptions are not always accurate, and the errors that follow, along with other errors that can take place in the selective coordination study, can be unwittingly translated into the actual construction of the electrical distribution system. Moreover, once a selective coordination study has been completed and the study is implemented in hardware, in practice, little adjustment can be made, except for replacing circuit breakers with other types of circuit breakers. Some conventional circuit breakers include mechanical adjustments, which allow the time-current characteristics of the circuit breakers to be manually adjusted once they have been installed. However, those adjustments are often inadequate at preventing the time-current uncertainty bands of the various circuit breakers from overlapping and upstream breakers end up tripping prematurely or unnecessarily, causing a larger portion of the distribution system to be de-energized than is necessary.

BRIEF SUMMARY OF THE INVENTION

Methods, systems and apparatus for dynamically coordinating the time-current characteristics of a plurality of intelligently-controlled protection devices (PDs) in an electrical distribution system are disclosed. An exemplary dynamically coordinatable electrical distribution system includes a plurality of intelligently-controlled PDs, a communication and control bus (comm/control) bus, and a central computer. The plurality of intelligently-controlled PDs is configured to protect a plurality of associated electrical loads from faults, developing faults, and other undesired electrical anomalies. Each of the PDs further has electrically adjustable time-current characteristics. The intelligently-controlled PDs are communicatively coupled to the comm/control bus and configured to report current data representative of real-time currents flowing through their respective loads to the central computer, via the comm/control bus. The central computer is configured to communicate with the plurality of PDs over the comm/control bus and dynamically coordinate the time-current characteristics of the plurality of PDs based on the current data it receives from the PDs.

Further features and advantages of the invention, including a detailed description of the above-summarized and other exemplary embodiments of the invention, will now be described in detail with respect to the accompanying drawings, in which like reference numbers are used to indicate identical or functionally similar elements.

BRIEF DESCRIPTION OF THE DRAWINGS

FIG. 20 is drawing depicting a one-line graphical user interface (GUI) page that is displayed on the display of the central computer (in this case, a touchscreen display of a tablet computer) and that a user can view and interact with;

FIG. 21 is a drawing depicting a panel GUI page that is displayed on the display of the central computer (in this case, a touchscreen display of a tablet computer) and that a user can view and interact with;

DETAILED DESCRIPTION

Figure 4:
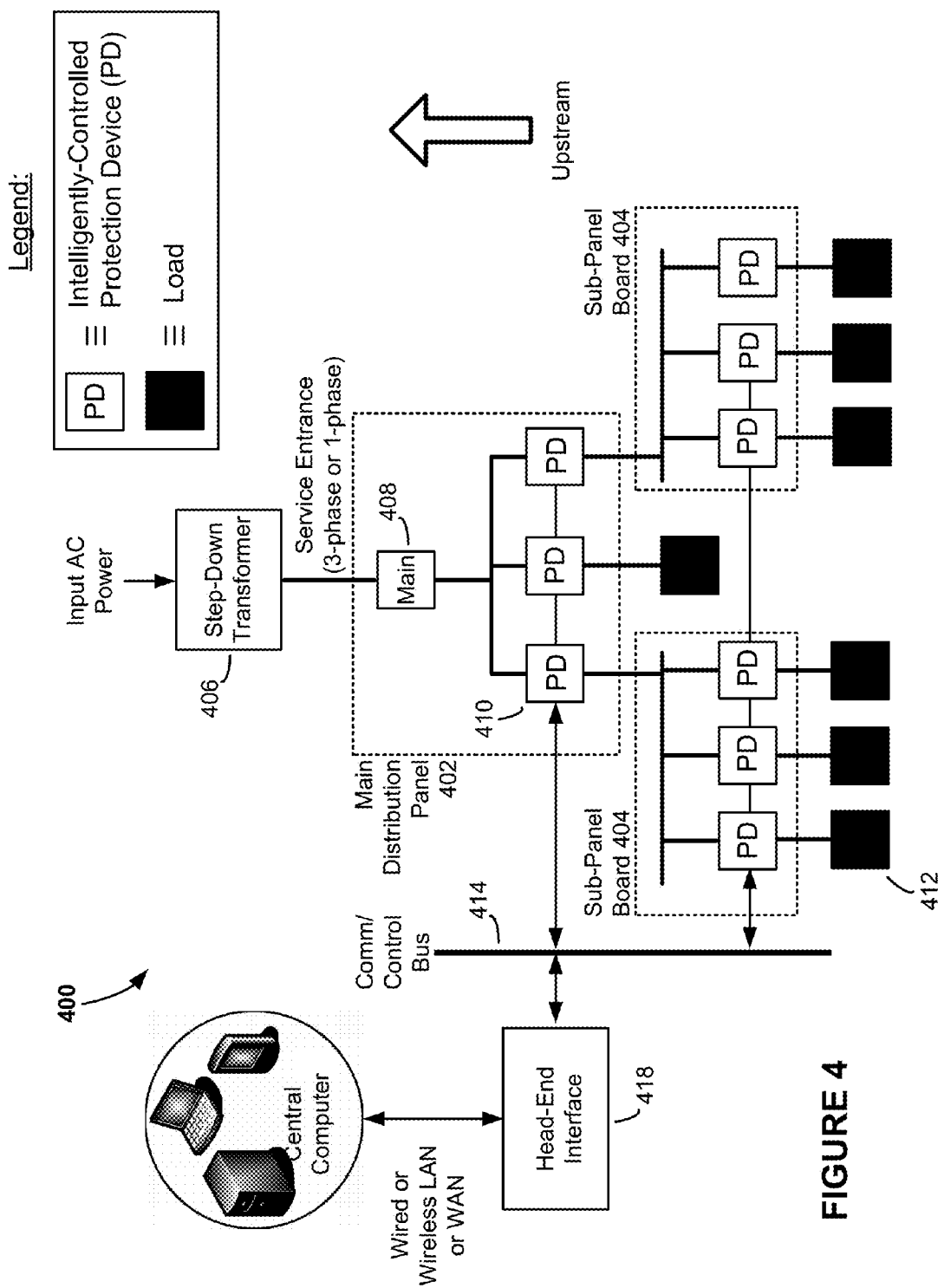
FIG. 4 is a one-line drawing of a dynamically coordinatable electrical distribution system, according to an embodiment of the present invention.

Referring to FIG. 4, there is shown a one-line drawing of a dynamically coordinatable electrical distribution system 400, according to an embodiment of the present invention. The dynamically coordinatable electrical distribution system 400 may be deployed in the vicinity of the service drop of a building (e.g., a residence, or commercial building), as part of the switchgear in an industrial complex or electrical distribution station or substation, or, in fact, at any stage, section or facility of an electrical power system where a grouping or hierarchy of circuit breakers is desired or necessary to control distribution of power. As illustrated in FIG. 4, the dynamically coordinatable electrical distribution system 400 includes a main distribution panel (MDP) 402 and may further include one or more sub-panelboards 404. The MDP 402 has a service entrance, through which AC power from an input AC power source, such as may be provided at the output of a step-down transformer 406, for example, connects to a power bus, power cables, or busbars in the MDP 402. (It should be mentioned that, although in the description that follows an AC electrical distribution system is assumed, the present invention may also be adapted for use in direct current (DC) electrical distribution systems.) Depending on the application, the input AC power may be 3-phase or 1-phase power. A main circuit breaker 408 in the MDP 402 controls whether the received input AC power can be distributed to the remainder of the system. When the main circuit breaker 408 is OFF (i.e., open) the remainder of the system is de-energized and electrically isolated from the input AC power. When the main circuit breaker 408 is ON (i.e., closed) input AC power is allowed to be distributed to inputs of intelligently-controlled circuit breakers 410 in the MDP 402. These intelligently controlled circuit breakers 410 are referred to as "intelligently-controlled PDs," "protection devices," or most succinctly as "PDs" in the detailed description that follows. The descriptor "intelligently-controlled" is used to highlight the fact that the PDs function, and are of a significantly different construction, than conventional circuit breakers. Note the main circuit breaker 408 may also comprise an intelligently controlled PD. Alternatively, it may comprise a conventional circuit breaker.

As shown in FIG. 4, AC power from the MDP 402 is distributed, via one or more PDs 410, to one or more directly-connected loads 412 (depicted in the drawing using black-filled squares) and, if present, to one or more sub-panelboards 404, each of which further includes its own intelligently-controlled PDs 410 that selectively distribute electrical power downstream to additional loads 412.

The PDs 410 in the MDP 402 and sub-panelboard(s) 404 of the dynamically coordinatable electrical distribution system 400 are further configured so that they are in electrical communication with a communications and control bus ("comm/control bus") 414. The comm/control bus 414 may comprise any suitable bus technology, such as, for example, an inter-IC (I2C) bus or controller area network (CAN) bus. As will be explained in further detail below, the comm/control bus 414 provides the ability of the PDs 410 to communicate with, and to be controlled by, a central computer 416, via a head-end interface 418. The head-end interface 418 can be implemented in various ways, depending on the type of comm/bus 414 being used and the type of operating system and communication protocol used by the central computer 416. In one embodiment of the invention, the head-end interface 418 includes an adapter or gateway that allows the central computer 416 to make a wired connection to the head-end interface 418, for example, using universal serial bus (USB) technology, Ethernet technology, or other wired connection technology. In another embodiment of the invention, the head-end interface 418 includes a wireless transceiver (for example, a Wi-Fi transceiver), which allows a wireless transceiver in the central computer 416 to communicate with the comm/control bus 414 and PDs 410 over a wireless link. As will be discussed in detail below, among other tasks, the central computer 416 serves to analyze current data information collected from the PDs 410; compute, set, and adjust, even in real time, the time-current characteristics (e.g., trip current, time-to-trip, and/or amperage ratings) of the various PDs 410; and dynamically coordinate the various PDs 410 in the distribution system 400.

Figure 5:
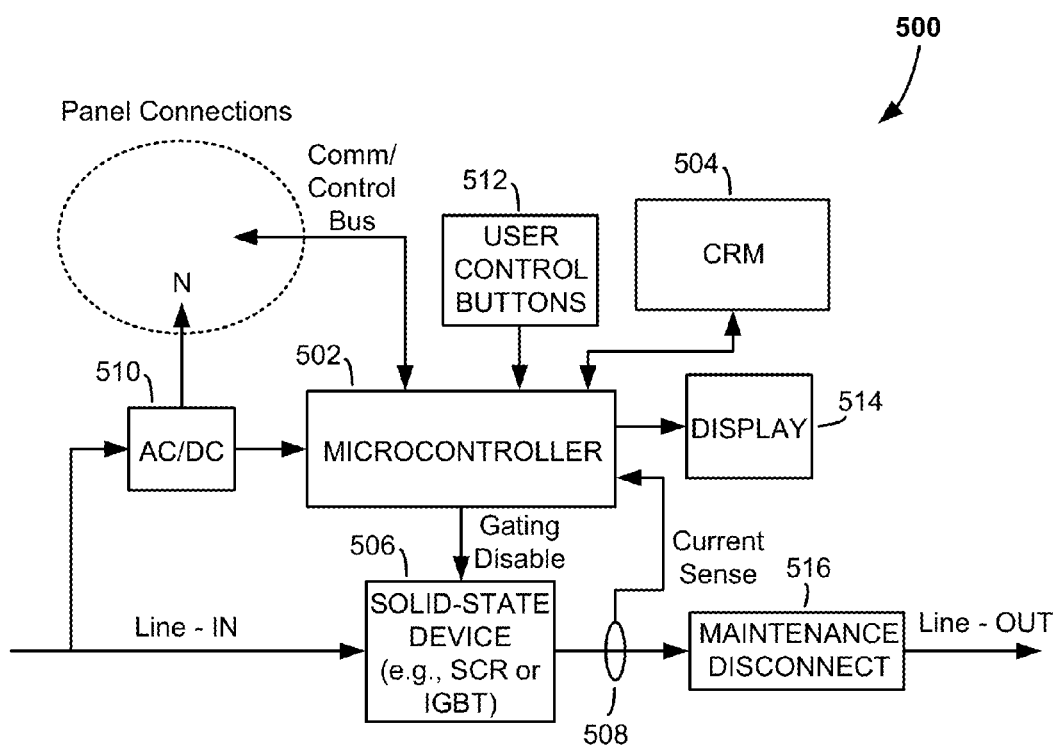
FIG. 5 is a drawing that depicts one way in which the intelligently-controlled protection devices (PDs) in the dynamically coordinatable electrical distribution system depicted in FIG. 4 can be implemented, in accordance with one embodiment of the invention.

FIG. 5 is a drawing that depicts one way in which each of the PDs 410 of the dynamically coordinatable electrical distribution system 400 can be implemented, in accordance with one embodiment of the invention. The exemplary PD 500 comprises a microcontroller 502, computer-readable media (CRM) 504; a solid-state device 506; a current sensor 508; an AC/DC converter 510; user control buttons 512; a visual display 514; and a maintenance disconnect mechanism 516. Depending on the design and application, the PD 500 can be a 3-phase device, a 1-phase device, or a DC device. In the case of a 3-phase device, the PD 500 is designed, configured and controlled to measure three current measurements, thereby allowing the system to react to any type of fault, including 3-phase and single-line ground faults.

The solid-state device 506 may comprise any suitable controlled solid-state device, such as a silicon-controlled rectifier (SCR), insulated-gate bipolar transistor (IGBT), power metal-oxide-semiconductor field-effect transistor (power MOSFET), etc.

The AC/DC converter 510 serves to convert AC power from the input AC line (labeled "Line-IN" in FIG. 5) to DC power for powering the microcontroller 502 and other DC components in the PD 500. In another embodiment of the PD, a separate and dedicated DC power supply independent of AC line power is used.

The microcontroller 502 in the exemplary PD 500 includes one or more input/output ports that allow the PD 500 to connect to the comm/control bus 414, thereby allowing the central computer 416 to address, identify, communicate with, and control the PD 500. The microcontroller 502 operates according to computer program instructions stored in the PD's CRM 504. The CRM 504 may comprise nonvolatile memory (e.g., flash-memory etc.), a magnetic or optical memory, random access memory (RAM) or any combination of these or other types of computer readable media. The CRM 502 may be entirely external to the microcontroller 502 (as depicted in the FIG. 5) or may be embedded, whole or in part, in the microcontroller 502.

The computer program instructions stored in the CRM 504 are addressable by the microcontroller 502 and when fetched and retrieved from the CRM 504 direct: how and when the microcontroller 502 produces a Gating Disable signal to turn OFF PD's solid-state device 506 and instructions and/or commands that direct how and when the microcontroller 502 reports information (e.g., current and voltage information relating to its load) over the comm/control bus 414 to the central computer 416. The computer program instructions may further include instructions that allow the microcontroller 502 to monitor and determine current flow direction through the solid-state device 506. With this capability, specific sections of the electrical distribution system that may be at risk of reverse current flow, for example, as forced by the back-EMF of induction motors and field current failures on electrical generators, can be de-energized when necessary.

The computer program instructions stored in the CRM 504 of the PD 500 may further include instructions that direct: how and when the microcontroller 502 reports identification information to the central computer 416 over the comm/control bus 414 (e.g., physical address, PD model name and number, fed-from information, and the name and type of load being protected by the PD 500); how the microcontroller 502 responds to activations of the user control buttons 512; and/or how and what kind of information is displayed on the PD's display 514 such as, for example, amperage rating of the PD 500, real-time load current and voltage information, PD name, PD model number, fed-from information, and/or any other real-time or non-real-time information. Preferably, the display 514 comprises an electronic ink display, which is a display technology that allows the information that is being displayed to continue to be displayed even after power to the display 514 is removed.

It should be mentioned that whereas in the exemplary embodiment of the invention described here, each of the various PDs includes its own dedicated microcontroller 502, a single microcontroller or microprocessor could be alternatively employed to control a plurality of the PDs 500 in a given locale (for example, a plurality of PDs in each panelboard).

Figure 6:
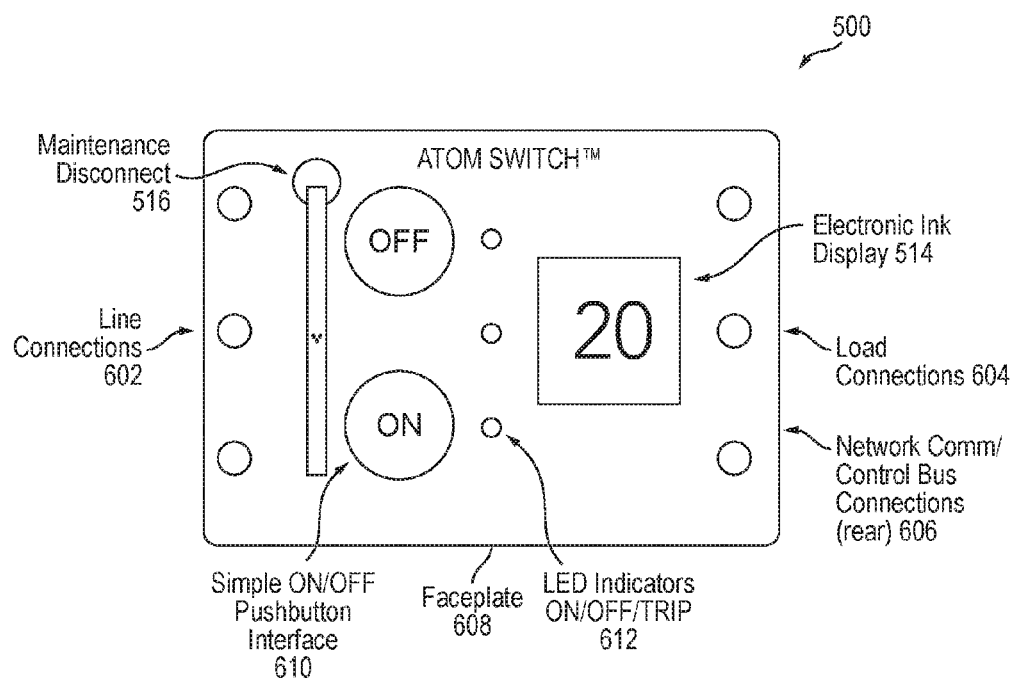
FIG. 6 is a perspective drawing of the PD depicted in FIG. 5, illustrating how the PD can be housed within an enclosure and showing other aspects, elements and features of the PD.

As shown in FIG. 6, the PD 500 also includes: line connection terminals (Line-IN and Line-OUT) 602 and 604 for connecting the PD 500 to the AC input and load; a comm/control bus connector 606 that connects the PD 500 to the comm/control bus 414; a faceplate 608 with cut-outs for receiving the user control buttons 512, which may include ON and OFF buttons 610 (e.g., green-colored ON button and red-colored OFF button or, alternatively, red-colored ON button and green-colored OFF button) that power-up and power-down the PD 500 and a RESET button (not shown); indicator lights (for example light-emitting diodes (LEDs) 612, which preferably emit light of different colors for indicating the ON, OFF and TRIP status of the PD 500; an optional audible alarm; a cut-out through which the electronic ink display 514 can be viewed; and a maintenance-disconnect tab or latching mechanism 516 that allows electricians to remove the faceplate 608 so that troubleshooting and maintenance can be performed. In one embodiment of the invention, the maintenance-disconnect mechanism 516 is designed so that when the faceplate 608 is removed electrical power is isolated, thereby protecting electricians and anyone else who may come in contact with the PD 500 with the faceplate 608 removed from electrical hazards, and ensuring compliance with lockout/tagout (LOTO) procedures, which may be required by electrical codes.

Because the PD 500 employs the solid-state device 506, it is able to detect and respond to faults, impending faults and other electrical anomalies much more rapidly than is possible if a conventional electromechanical circuit breaker was to be used. The solid-state device 506 has the inherent ability to change states (i.e., to be turned ON and OFF) in a matter of microseconds. By employing the solid-state device 506, the PD 500 is therefore able to isolate faults and developing faults over a thousand times faster than is possible using a conventional electromechanical circuit breaker, which typically take several milliseconds to respond to and isolate faults and developing faults.

Figure 1:
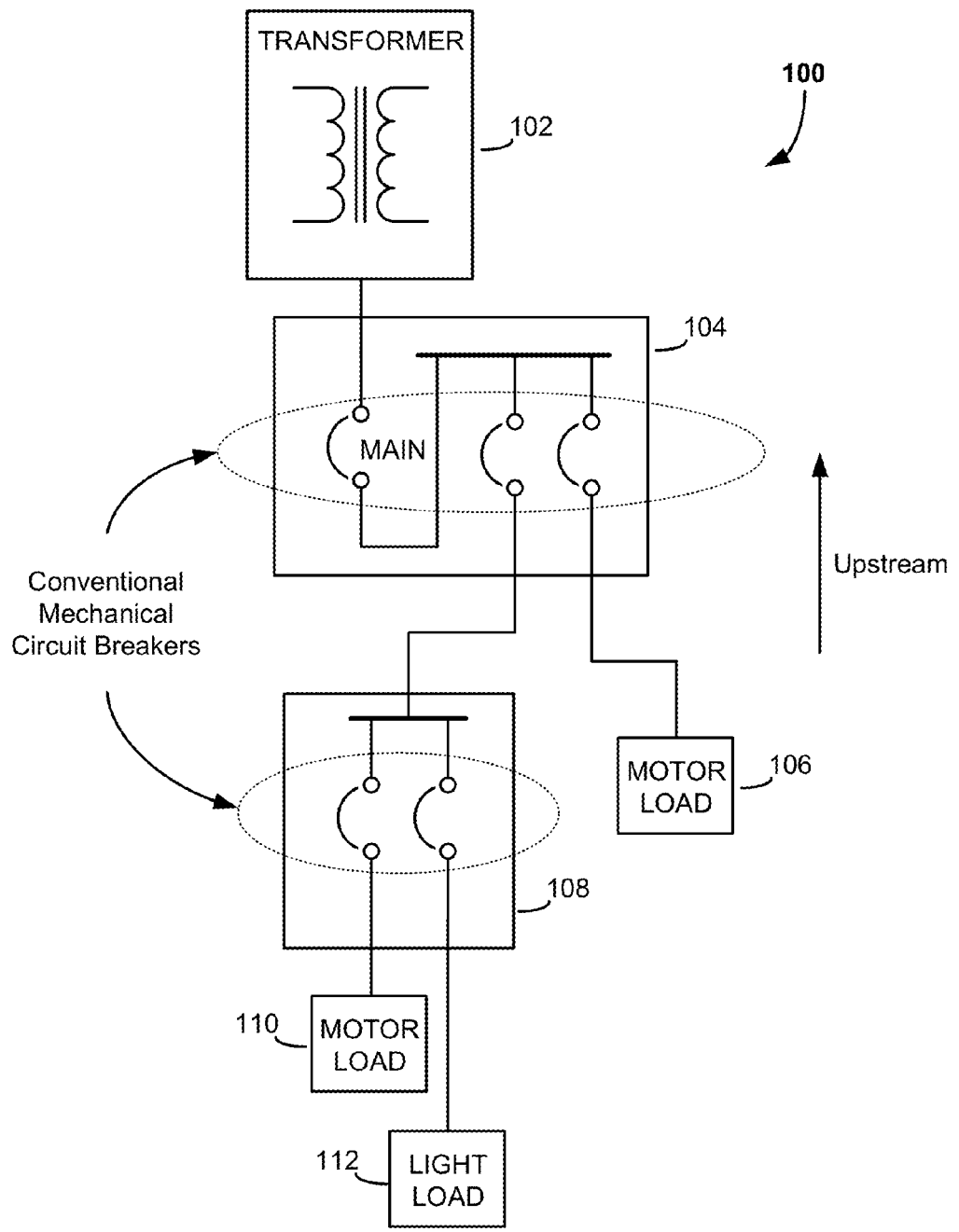
FIG. 1 is a one-line drawing of a typical electrical distribution system, illustrating how conventional circuit breakers are deployed in the distribution system.
Figure 2:
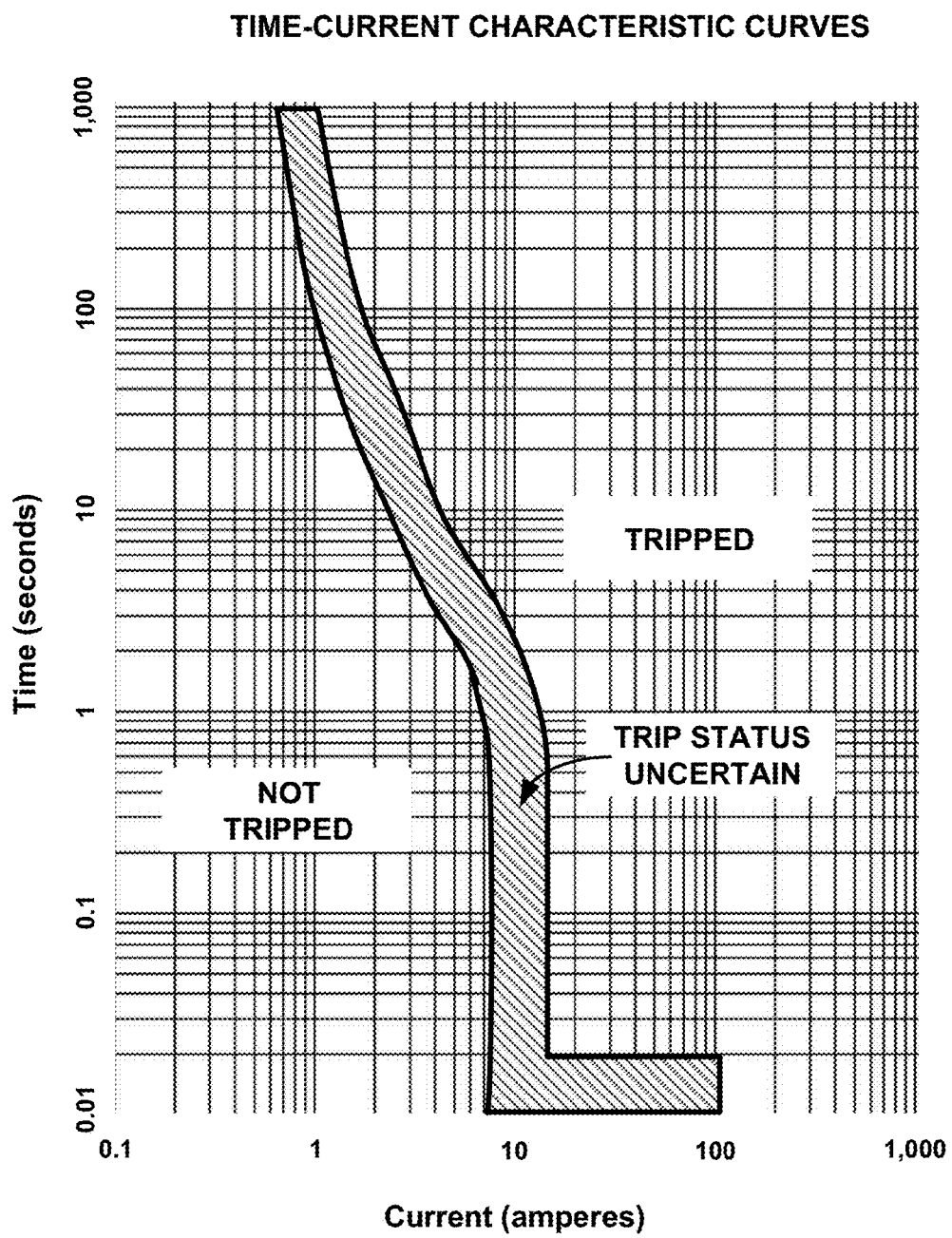
FIG. 2 is a drawing showing the time-current characteristics of a conventional electromechanical circuit breaker.
Figure 3:
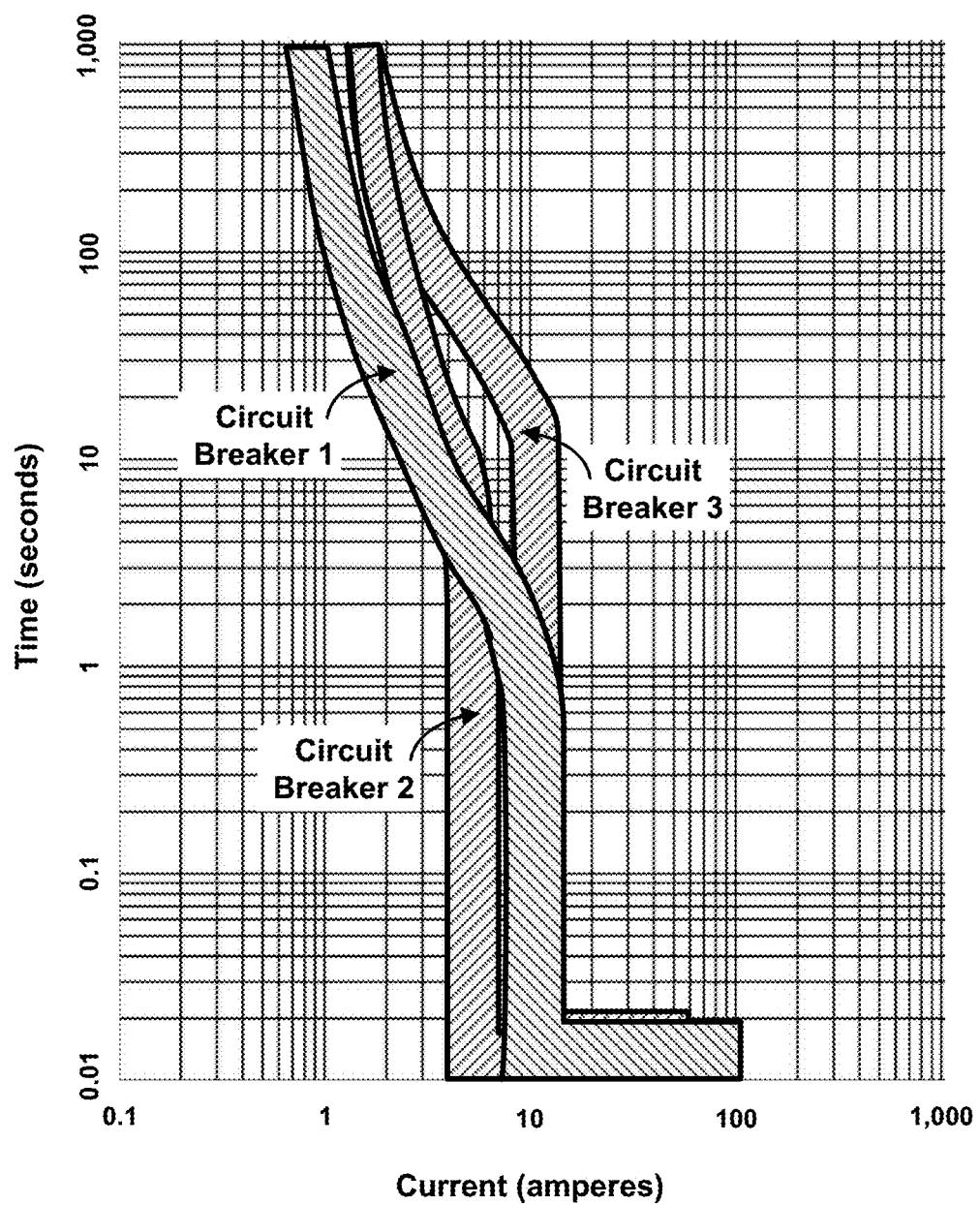
FIG. 3 is a drawing showing the time-current characteristics of several conventional electromechanical circuit breaker, highlighting how the time-current uncertainty bands of the circuit breakers can overlap, even after completing a selective coordination study.
Figure 7:
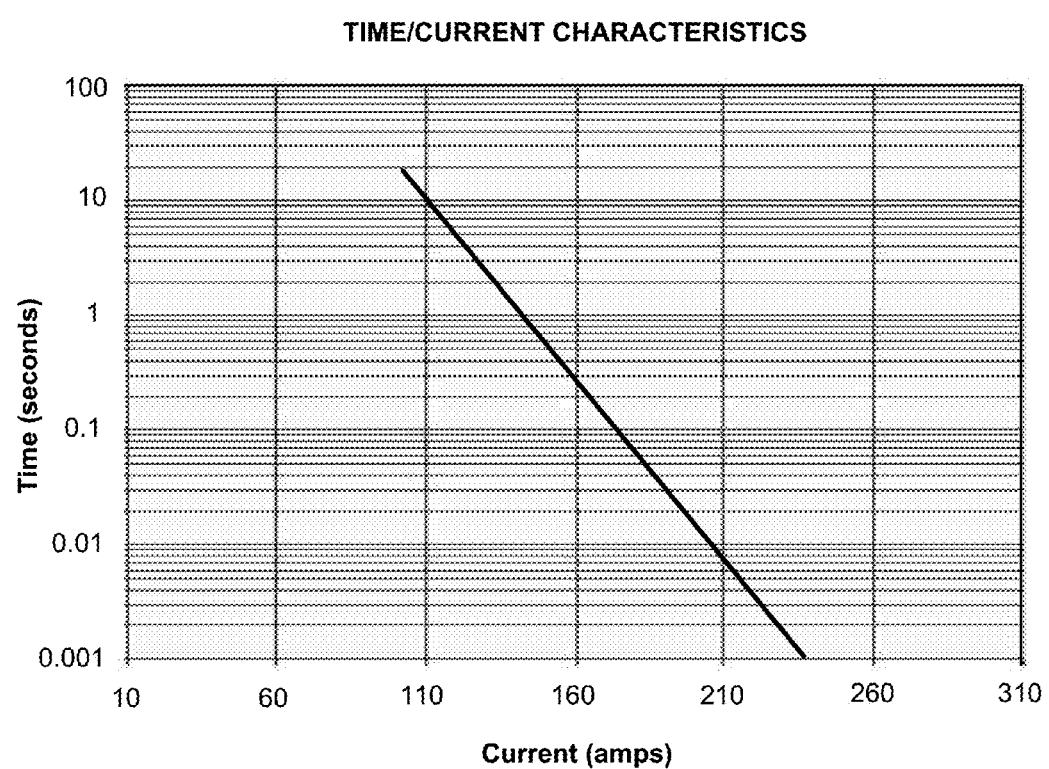
FIG. 7 is a drawing showing the time-current characteristics of the PD depicted in FIGS. 5 and 6.

In addition to having the ability to isolate faults and developing faults nearly instantaneously, another significant benefit provided by the PD 500 is that its time-current characteristics are much more precise than are the time-current characteristics of conventional electromechanical circuit breakers. Solid-state devices can be manufactured repeatedly to have nearly identical operating characteristics. This repeatability-in-manufacturing capability significantly reduces variability from one solid-state device to another and, consequently, the variability from one PD 500 to another. The current conducted by the solid-state device 506 can also be rapidly controlled and with a much higher degree of precision than is possible in conventional electromechanical circuit breakers. These attributes result in the PD 500 having a time-current characteristic data profile that is represented by a single line, as illustrated in FIG. 7. In contrast, and was explained above in reference to FIG. 2, conventional electromechanical circuit breakers of the same type and rating, and even of the same type and rating provided by the same manufacturer, have time and current characteristics that tend to vary with a high degree of variability, resulting in uncertainty bands in their time-current characteristics. (Compare FIG. 7 to FIG. 2.)

Figure 8:
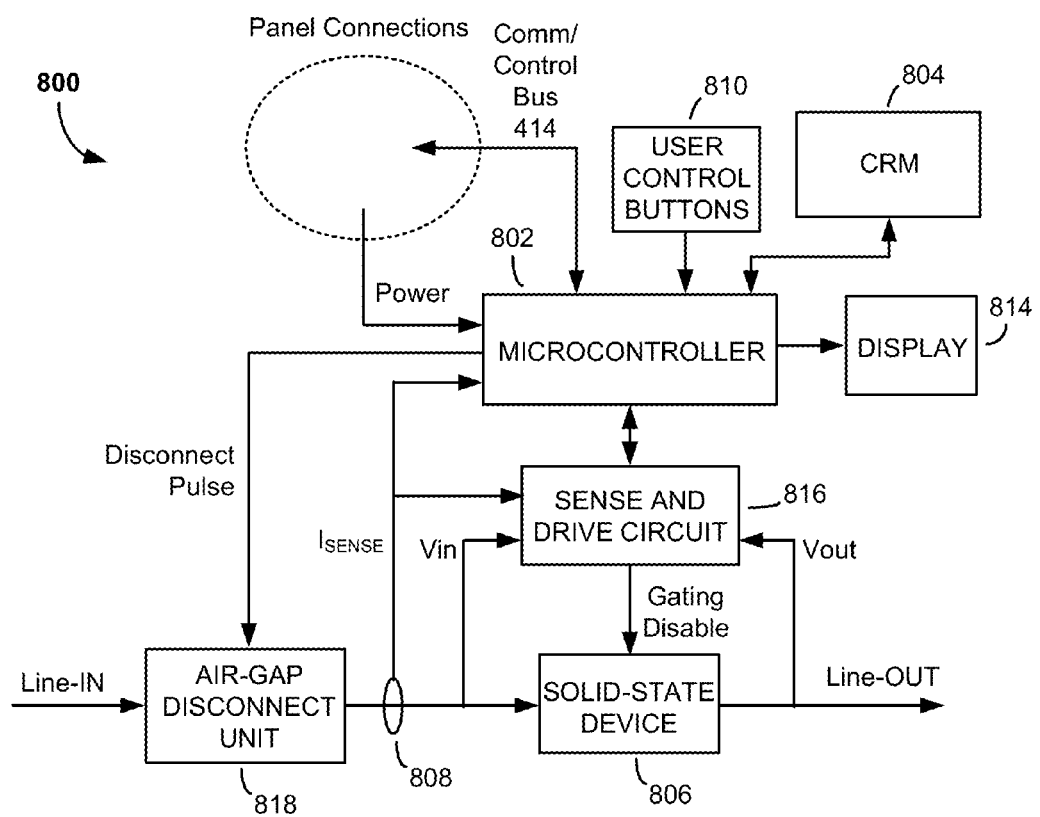
FIG. 8 is a drawing that depicts one way in which the PDs in the dynamically coordinatable electrical distribution system depicted in FIG. 4 can be implemented, in accordance with one embodiment of the invention.

FIG. 8 is a drawing depicting another way in which the PDs 410 of the dynamically coordinatable electrical distribution system 400 can be implemented, in accordance with another embodiment of the invention. The PD 800 is similar to the PD described in co-pending and commonly assigned U.S. Patent Application No. 62/301,948, which is incorporated herein by reference. Like the PD 500 described above in reference to FIGS. 5 and 6, the PD 800 includes a microcontroller 802; computer-readable media (CRM) 804; a solid-state device 806; a current sensor 808; a DC power source (not shown); user control buttons 810; and a display 814. However, unlike the PD 500, the PD 800 further includes a sense and drive circuit 816, which controls the ON/OFF status of the PD's 800's solid-state device 806 (rather than relying on the microcontroller to perform that task) and an air-gap disconnect unit 818, which is connected in series with the solid-state device 806, between the Line-IN terminal and line-in input of the solid-state device 806. The various components of the PD 800 operate similar to the PD 500 described above, except that the sense and drive circuit 816 is employed to detect the occurrence of faults and developing faults and generate the Gating Disable signal to turn the solid-state device 806 OFF when conditions warrant, rather than directly by the microcontroller (as in the PD 500). Another difference between the PD 500 and the PD 800 is that the PD 800 includes the air-gap disconnect unit 818, which as explained in detail below adds an additional level of isolation capability not provided by the PD 500.

Figure 9:
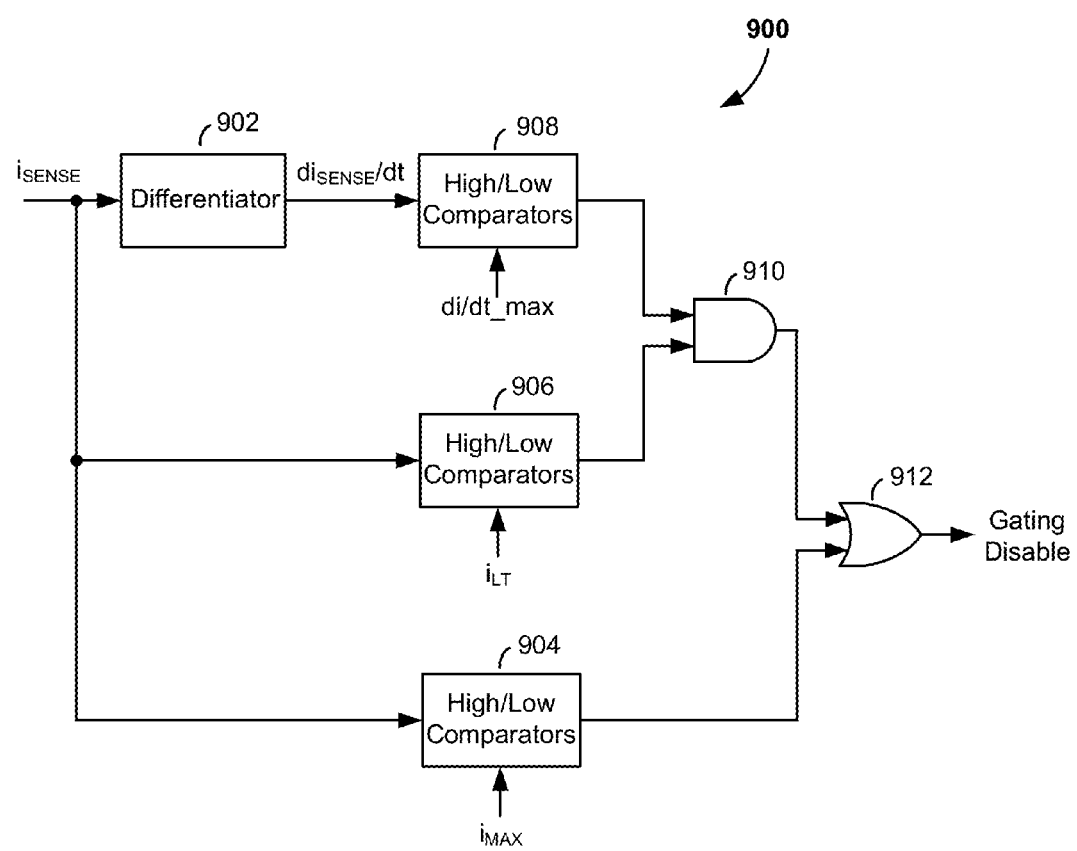
FIG. 9 is a functional circuit block diagram of the fault detection and response circuitry used in the sense and drive circuit of the PD in FIG. 8.

FIG. 9 is a functional circuit block diagram of the fault detection and response circuitry 900 used in the sense and drive circuit 816 of the PD 800, in accordance with one exemplary embodiment of the invention. The fault detection and response circuitry 900 comprises: a differentiator 402; first, second and third high/low comparators 904, 906, 908; an AND logic gate 910; and an OR gate 912. The various electrical components of the fault detection and response circuitry 900 are preferably mounted on printed circuit board (PCB), which may be the same PCB upon which the microcontroller 802 is included or may be a separate PCB dedicated for the sense and drive circuit 816.

Figure 10:
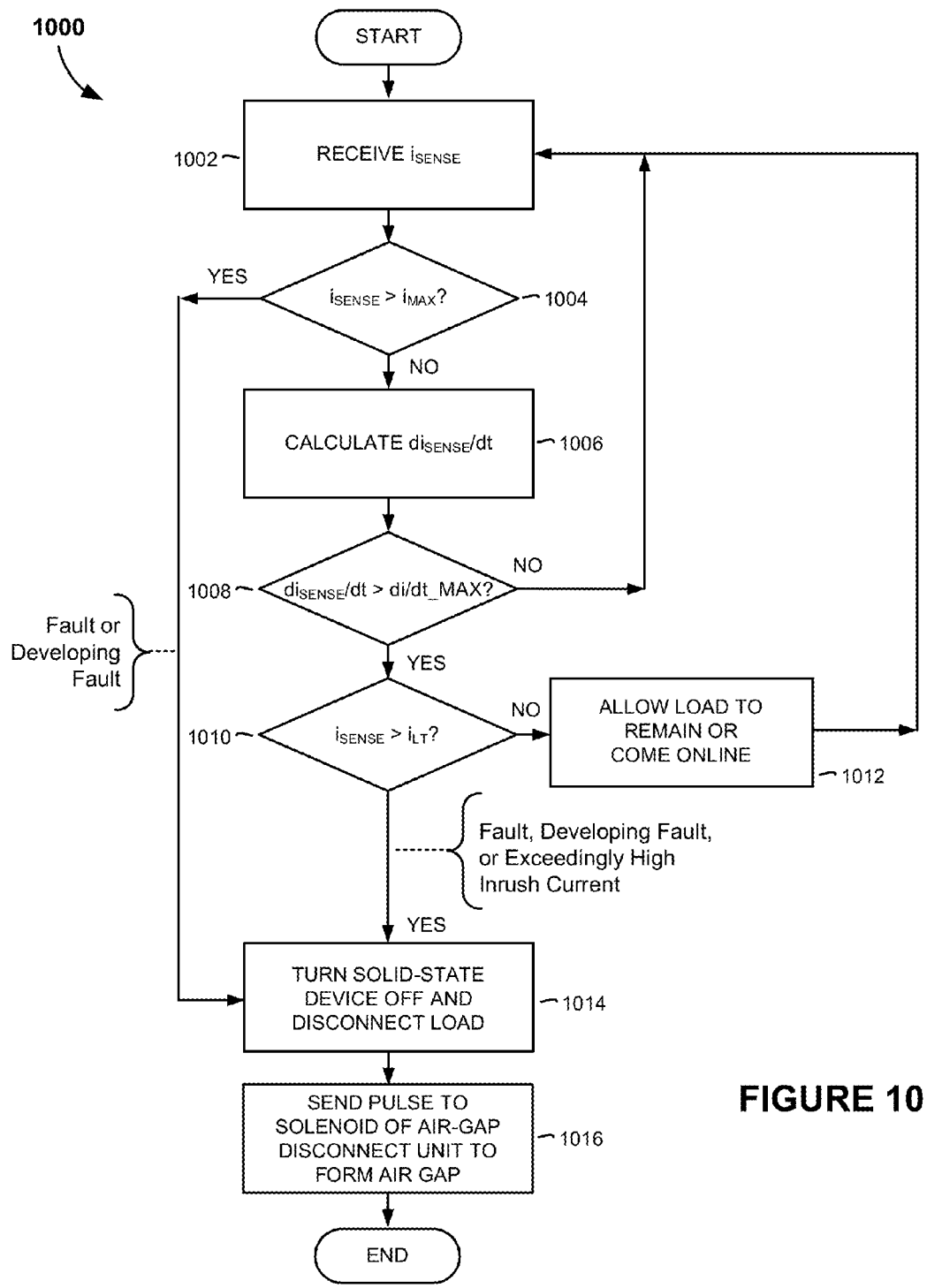
FIG. 10 is a drawing of a flowchart that illustrates a method that the fault detection and response circuitry of the sense and drive circuit of the PD depicted in FIG. 8 follows in detecting and responding to faults and developing faults.

The fault detection and response circuitry 900 serves to determine whether a sudden increase in current being drawn by the PD's load circuit is due to a load being brought online or is due to a fault or developing fault. This function is important since it avoids the solid-state device 806 from being turned OFF unnecessarily when the sudden increase in current is due to a load being brought online and not because of fault or developing fault. The fault detection and response circuitry 900 is also capable of distinguishing between resistive and inductive loads and determining whether a sudden increase in current corresponds to an inrush current of an inductive load when being brought online or may be the result of a developing fault. FIG. 10 is a flowchart that illustrates a method 1000 that the fault detection and response circuitry 900 of the sense and drive circuit 816 follows in performing these various functions. First, at step 1002, the fault detection and response circuitry 900 receives a sense current $i_{SENSE}$ from the PD's current sensor 808. The sense current $i_{SENSE}$ represents the real-time line current being drawn by the load circuit that the PD 800 is serving to protect. At decision 1004 the first high/low comparator 904 in the fault detection and response circuitry 900 determines whether the received sense current $i_{SENSE}$ has exceeded an "instant-trip threshold current" $i_{MAX}$. The instant-trip threshold current $i_{MAX}$ establishes the absolute maximum current that the PD 800 will allow to flow into the load circuit, under any circumstance. If the current being drawn into the PD's load circuit (as represented by the sense current $i_{SENSE}$) ever exceeds the instant-trip threshold current $i_{MAX}$, the first high/low comparator 904 produces a logic HIGH output, which after passing through the OR logic gate 912 will quickly turn the PD's solid-state device 806 OFF, as indicated by step 1014 in the method. The time it takes to turn the solid-state device 806 OFF is limited only by the propagation delay through the first high/low comparator 904 and the reaction time of the solid-state device 806 in switching from an ON state to an OFF state. The word "instant" is used here to indicate that this time will be on the order of a few microseconds or even less. Immediately after, or as soon as the solid-state device 806 is being directed to turn OFF, at step 1016 in the method 1000 the PD's microcontroller 802 will send an electrical pulse to a solenoid in the air-gap disconnect unit 818 of the PD 800 (see FIG. 8). The purpose and function of the air-gap disconnect unit 818 will be described in detail below.

It should also be emphasized that the various steps and decisions in the method 1000 represented in the flowchart in FIG. 10 are not necessarily performed in the order shown. Additionally, because various of the operations performed by the fault detection and response circuitry 900 are performed continuously or simultaneously, the various steps and decisions in the flowchart should not be viewed as necessarily being a timed sequence of events. For example, although decision 1004 appears as a discrete step in a sequence of steps and decisions, decision 1004 is actually performed continuously. So is step 1002 and possibly other steps and decisions in the method 1000.

The differentiator 902 in the fault detection and response circuitry 900 serves to differentiate the sense current $i_{SENSE}$ it receives from the PD's current sensor 808 and produce a differentiated sense current $di_{SENSE}/dt$. This step in the method 1000 is indicated by step 1006 in the flowchart. The differentiated sense current $di_{SENSE}/dt$ is the rate of change of the sense current $i_{SENSE}$ and is used by the fault detection and response circuitry 900 to determine whether a sudden change in sense current $i_{SENSE}$ is due to a resistive load being brought online or is representative of a developing fault. Because the line current and sense current $i_{SENSE}$ are AC signals, with positive and negative half cycles, and since a sudden increase in line current (as represented by the sense current $i_{SENSE}$) can possibly occur during either positive or negative half cycles, the differentiator 902 differentiates both positive and negative half cycles of the sense current $i_{SENSE}$. In this way the fault detection and response circuitry 900 can determine whether a fault may be developing during both positive and negative half cycles of the line current.

The second and third high/low comparators 906 and 908 and AND logic gate 910 are the components of the fault detection and response circuitry 900 that determine whether a sudden change in sense current $i_{SENSE}$ is due to a resistive load being brought online or is representative of a developing fault. As alluded to above, the ability to make this distinction is important since it avoids the solid-state device 806 of the PD 800 from being turned OFF unnecessarily or prematurely in the event that a sudden increase in current is due to a resistive load being brought online and not because of an impending fault. As part of making this determination, at decision 1008 in the method 1000, the third high/low comparator 908 compares the differentiated sense current $di_{SENSE}/dt$ to a predetermined maximum rate of change in current di/dt_max. If at decision 1008 the differentiated sense current $di_{SENSE}/dt$ is determined to exceed the maximum rate of change in current di/dt_max, the third high/low comparator 908 produces a logic HIGH output. The logic HIGH output provides an indication that a fault may be (though not necessarily) developing in the PD's load circuit. On the other, if at decision 1008 it is determined that the differentiated sense current $di_{SENSE}/dt$ is less than the maximum rate of change in current di/dt_max, the output of the third high/low comparator 908 remains at a logic LOW.

It should be emphasized the fault detection and response circuitry 900 will continue to compare the sense current $i_{SENSE}$ to the instant-trip threshold current $i_{MAX}$ (at decision 1004), regardless of the value of the differentiated sense current $di_{SENSE}/dt$. As explained above, the first high/low comparator 904 and OR logic gate 912 will direct the solid-state device 806 to immediately turn OFF (at step 1014 in the flowchart) if the sense current $i_{SENSE}$ ever rises to a level that exceeds the instant-trip threshold current $i_{MAX}$. In other words, even if it is determined that the differentiated sense current $di_{SENSE}/dt$ is less than the maximum rate of change in current di/dt_max at decision 1008, the solid-state device 806 will be turned OFF if $i_{SENSE}$ ever become greater than $i_{MAX}$.

When a resistive load is being brought online, the current that it draws from the line will be step-like. However, a developing fault will also produce a step-like change in current. Since $di_{SENSE}/dt$ is high both when the resistive load is being brought online and when a fault is developing in the PD's load circuit, a $di_{SENSE}/dt$ that exceeds di/dt_max is not by itself sufficient to conclude whether a resistive load is being brought online or whether a fault is developing in the PD's load circuit. However, one significant difference between a developing fault and the a resistive load being brought online is that once the step-like change in current of the resistive load has completed, which will happen very quickly, the magnitude of current that the resistive load draws will level off to some finite value—the specific value depending on the resistance of the load. On the other hand, when a fault is developing, the magnitude of current being drawn from the line will rise and continue to rise to a magnitude that is limited only by the ability of the line to deliver current to the fault. The fault detection and response circuitry 900 exploits this difference by further employing the second high/low comparator 906. Specifically, as indicated by decision 1010 in the flowchart, the second high/low comparator 906 compares the magnitude of the sense current $i_{SENSE}$ to the magnitude of a "long-time trip threshold current" $i_{LT}$. If the current being drawn from the line (as represented by the sense current $i_{SENSE}$) rises to a value greater than the long-time trip threshold current $i_{LT}$, the second high/low comparator 906 produces a logic HIGH output. Accordingly, in a situation where both $di_{SENSE}/dt$ exceeds di/dt_max (a "YES" at decision 1008) AND the current being drawn from the line, as represented by the sense current $i_{SENSE}$, exceeds the long-time trip threshold current $i_{LT}$ (a "YES" at decision 1010), the AND logic gate 910 will generate a logic HIGH output. The logic HIGH output is a true indication that a fault is developing in the PD's load circuit or that an exceedingly high overload condition is present. Accordingly, once the AND logic gate 910 produces the logic HIGH output, and the logic HIGH output passes through the OR gate 912, a Gating Disable signal is produced at the output of the fault detection and response circuitry 900, to quickly turn the solid-state device 806 OFF, as indicated by step 1014 in the flowchart. By turning the solid-state device 806 OFF, the developing fault or exceedingly high overload condition is quickly isolated. On the other hand, even if at decision 1008 it is determined that $di_{SENSE}/dt$ is greater than di/dt_max, so long as it is determined at decision 1010 that the sense current $i_{SENSE}$ is below the long-time trip threshold current $i_{LT}$, a conclusion is drawn that the sudden change in sense current $i_{SENSE}$ (i.e., high $di_{SENSE}/dt$) is indicative of a resistive load being brought online and the AND logic gate 910 will produce a logic LOW output, thereby allowing the solid-state device 806 to remain ON and the resistive load to be brought online.

The fault detection and response circuitry 900 is further capable of distinguishing between resistive and inductive loads and protecting against exceedingly high inrush currents when an inductive load is being brought online. An inductive load will result in a smaller $di_{SENSE}/dt$ when being brought online compared to the near step-like $di_{SENSE}/dt$ that results when a resistive load is being brought online. Accordingly, when the inductive load is being brought online the AND logic gate 910 will not produce a logic LOW output, and so long as the sense current $i_{SENSE}$ remains below the instant-trip threshold current $i_{MAX}$ the first high/low comparator 904 will also maintain a logic LOW output as the inductive load is being brought online. However, if the inrush current that the inductive load is drawing while being brought online (or that it draws under any other circumstance) ever exceeds the instant-trip threshold current $i_{MAX}$, the first high/low comparator 904 will produce a logic HIGH output, which after passing through the OR logic gate 912, will direct the solid-state device 806 to turn OFF to protect the inductive load and the load circuit wiring from the exceedingly high inrush current.

The fault detection and response circuitry 900 in FIG. 9 provide an entirely hardware solution for detecting and responding to developing faults. A hardware solution is preferred since it provides the fastest way to detect and respond to impending faults. In fact, the fault detection and response circuitry 900 is capable of detecting and isolating developing faults in a matter of a few microseconds, or even less. While a hardware approach is preferred due to the fast detection and reaction capability, a 'software' approach could be alternatively used. The PD 500 described above in reference to FIG. 5 is an example of a software-controlled approach. There, the microcontroller 502 of the PD 500 is programmed and configured to detect and respond to developing faults and the microcontroller generates the Gating Disable that turns the solid-state device 506 OFF when conditions warrant.

Figure 11:
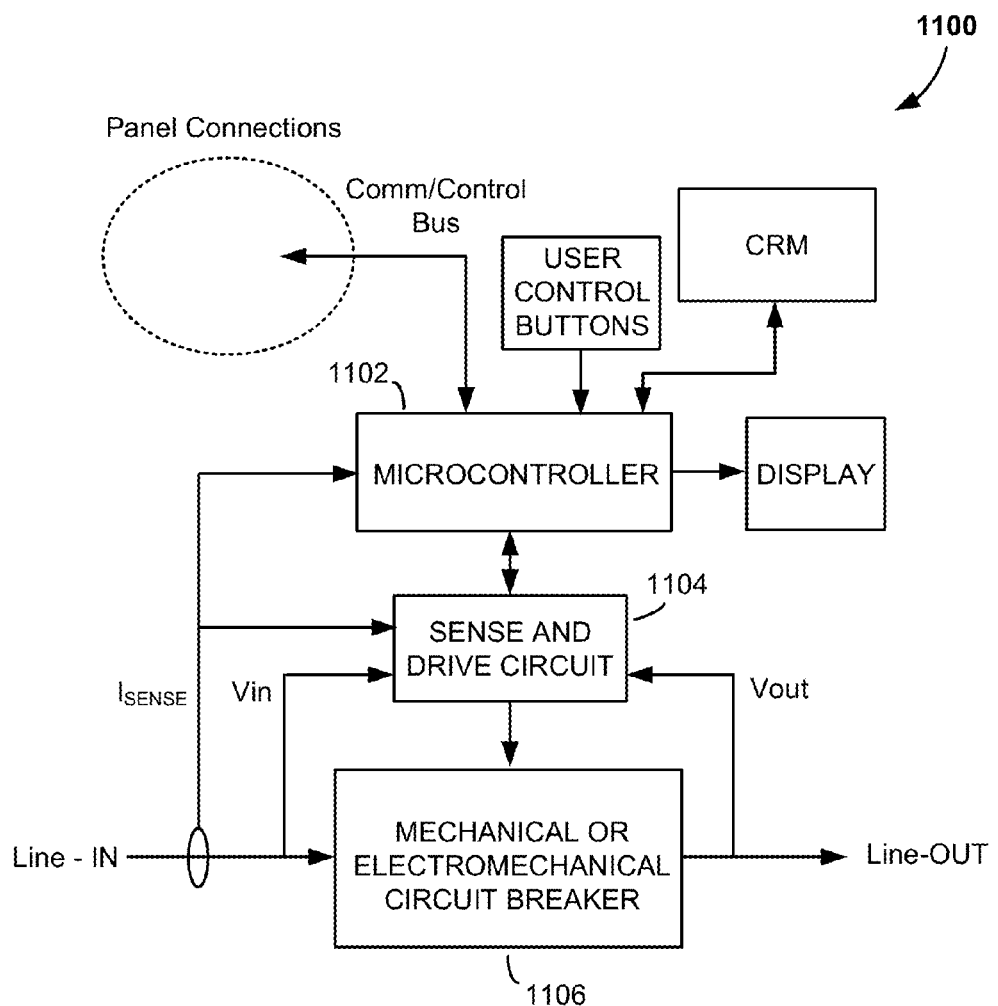
FIG. 11 is a drawing that illustrates how the PD depicted in FIG. 8 might possibly be modified to produce an intelligently-controlled PD having a mechanical or electromechanically-controlled circuit breaker.

Although the PD 500 depicted in FIG. 5 and the PD 800 depicted in FIG. 8 both utilize a solid-state device to isolate faults and other undesirable overcurrent conditions, it is possible that either PD (the PD 500 or the PD 800) could be modified so that it utilizes a mechanical or electromechanical circuit breaker. Although solid-state devices are preferred, controlling a mechanical or electromechanical circuit breaker using sense and drive circuit similar to that described above could possibly allow the mechanical or electromechanical circuit breaker to be controlled more rapidly compared to prior art approaches, and could possibly eliminate, or perhaps at least reduce to some extent, the time-current uncertainties associated with mechanical or electromechanical circuit breakers and/or improve the reaction time and precision at which those types of circuit breakers operate. FIG. 11 is a drawing that illustrates how the PD 800 might possibly be modified to produce a PD 1100 having a mechanical or electromechanically-controlled circuit breaker 1106. The PD 1100 includes a microcontroller 1102 programmed to perform functions similar to the microcontroller 802 of the PD 800 and a sense and drive circuit 1104 that controls the opening and closing of the mechanical or electromechanically-controlled circuit breaker 1106.

Figure 12:
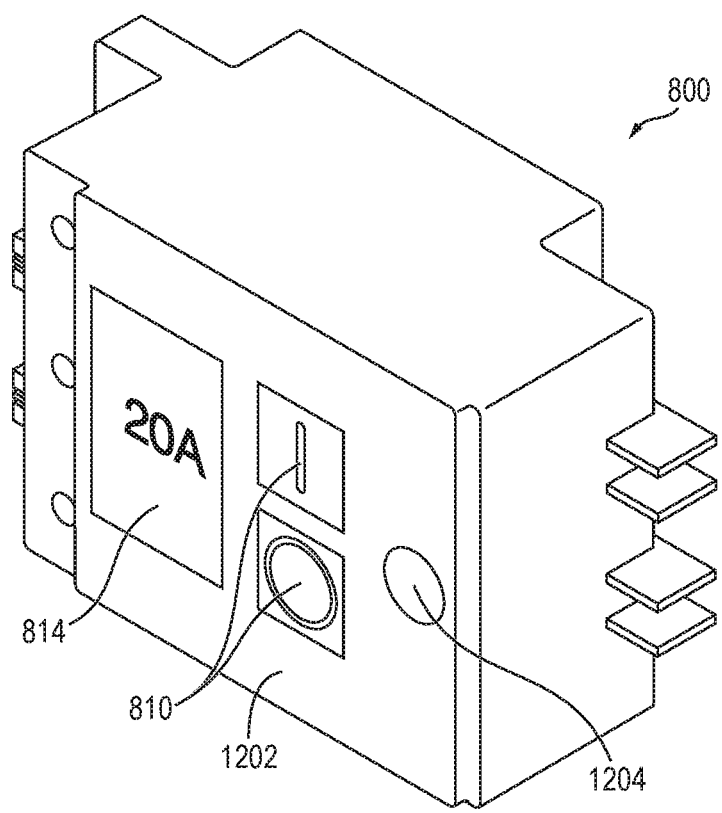
FIG. 12 is a perspective drawing of the PD depicted in FIG. 8, illustrating how the PD can be housed within an enclosure and showing other aspects, elements and features of the PD.

Like the PD 500 described above in reference to FIGS. 5 and 6, the various components of the PD 800 depicted in FIG. 8 are preferably housed in an enclosure, such as illustrated in FIG. 12. The enclosure includes a front face 1202 with cut-outs for the PD's 800's ON and OFF buttons 810; a cut-out for the electronic ink display 814; and a cut-out for an air-gap disconnect RESET button 1204, the purpose of which will be described next.

Figure 13:
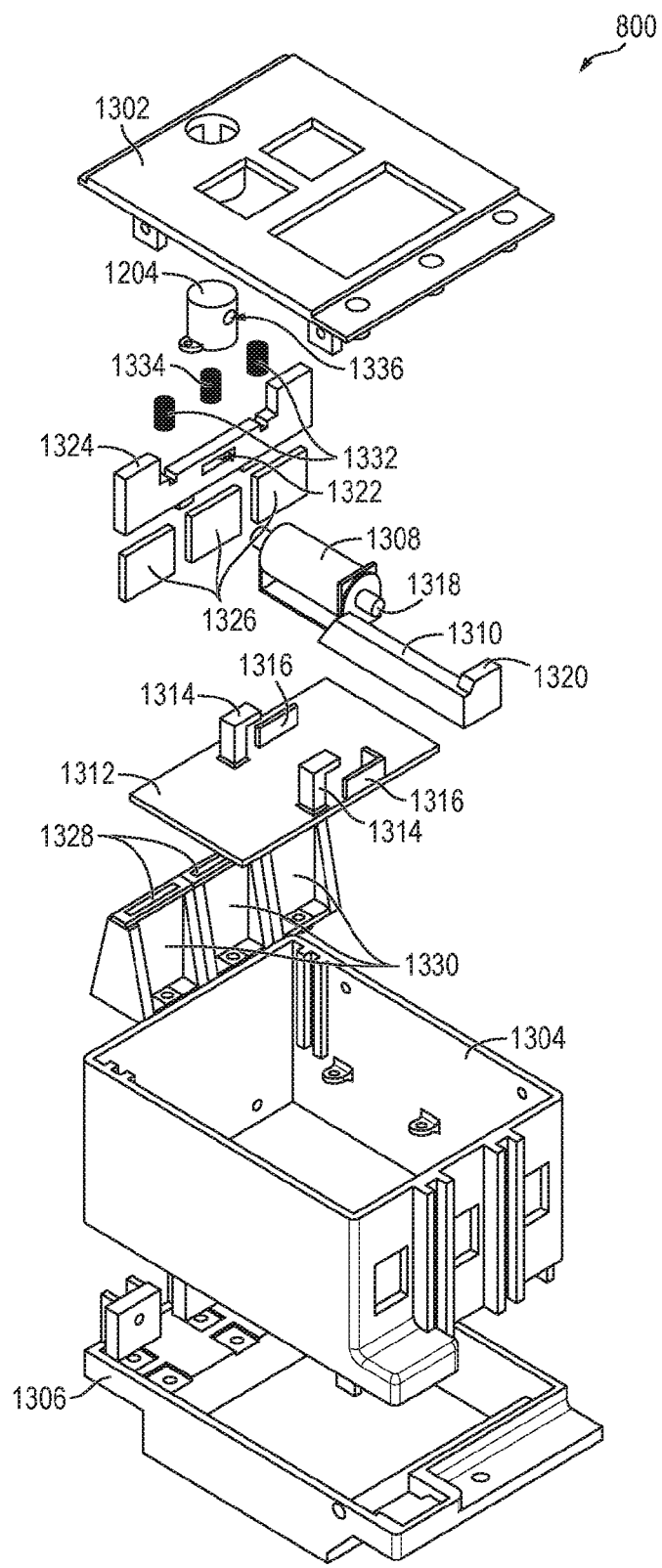
FIG. 13 is drawing of an exploded view of the PD depicted in FIG. 8, highlighting the physical attributes of the air-gap disconnect unit included in the PD and the various components involved in its operation.

FIG. 13 is an exploded view of the PD 800 without the electronics (microcontroller 802, sense and drive circuit 816, and solid-state device 806) shown. This exploded view of the PD 800 highlights the physical attributes of the air-gap disconnect unit 818 (see FIG. 8) and the various components involved in its operation, including the RESET button 1204. As shown in the drawing, the PD 800 is housed in an enclosure that includes a front enclosure member 1302, through which cut-outs for the ON/OFF buttons 810 (see FIG. 12), air-gap disconnect reset button 1204, and display 814 are made; a mid enclosure member 1304; and a bottom enclosure member 1306. A solenoid 1308, which forms the actuating component of the air-gap disconnect unit 818, and associated holding member 1310 are mounted next to one another on a mounting plate 1312, with the holding member 1310 designed to fit under the L-shaped holders 1314 and the solenoid 1308 mounted alongside on solenoid mounts 1316.

The solenoid 1308 includes a plunger 1318, which under normal operating conditions (e.g., in the absence of a fault, developing fault, or other unacceptable overcurrent condition) remains retracted in the solenoid housing. The holding member 1310 is configured to slide in a direction parallel to the direction that the plunger 1318 travels, and includes a tab 1320 at one end. The tab 1320 has a size and dimensions that allows it to fit inside a slot 1322 formed through a central section of a connector blade holster 1324. During normal operating conditions, when power is being distributed to the connected load and no fault or other undesired overcurrent condition is present or developing in the load circuit, the tab 1320 of the holding member 1310 remains positioned in the slot 1322 formed through the connector blade holster 1324. With the tab 1320 positioned in the slot 1322, the holding member 1310 serves to hold electrically conductive male connector blades 1326 in corresponding electrically conductive receptacles 1328 of a female line-to-load connector 1330 and prevent holster retraction springs 1332 from pulling the connector blade holster 1324 and attached male connector blades 1326 out of the receptacles 1328. By holding the electrically conductive male connector blades 1326 in the electrically conductive receptacles 1328, line current is allowed to flow to the load (so long as the solid-state device 806 is also ON). However, upon the sense and drive circuit 816 sensing and reporting to the microcontroller 802 that a fault or exceedingly high and unacceptable overcurrent condition is present or developing in the load circuit, the microcontroller 802 responds by transmitting an electrical pulse to the solenoid 1308. The electrical pulse causes the solenoid 1308 to eject its plunger 1318. The holding member 1310 is attached to the plunger 1318. Accordingly, when the plunger 1318 is ejected from the solenoid housing, the tab 1320 of the holding member 1310 is removed from the slot 1322 in the connector blade holster 1324. Once the tab 1320 has been removed from the slot 1322, the retraction springs 1332 are able to lift the connector blade holster 1324, pulling the attached electrically conductive male connector blades 1326 out of the electrically conductive receptacles 1328 of the female line-to-load connector 1330. Pulling the male connector blades 1326 out of the receptacles 1328 results in the formation of an air gap, which serves to fully isolate the load from whatever fault or other hazard is developing or is present. Because the air gap is in series with the solid-state device 806, the air gap also prevents any leakage current that might otherwise flow through solid-state device 806 from flowing into the load circuit.

It should be pointed out that the PD 800 depicted in FIG. 8 is an example of a three-phase PD. Accordingly, there are three male connector blades 1326 attached to the bottom of the connector blade holster 1324 and three corresponding receptacles 1328 formed in the female line-to-load connector 1330. In a single-phase PD, only a single male connector blade 1326 and corresponding single female receptacle 1328 would be needed to create the air gap. It should also be pointed out that the sense and drive circuit 816 described above in reference to FIG. 8 is an example of a sense and drive circuit 816 designed for use in a single-phase PD. In the case of a three-phase PD, the sense and drive circuit 816 could be modified for use in a three-phase PD, thereby allowing the modified sense and drive circuit to react to any type of fault or undesired overload condition, including three-phase and single-line ground faults.

During the air-gap disconnect process the air-gap-disconnect RESET button 1204 is forced out of (i.e., pops out of) the front enclosure member 1302 by a compression spring 1334. The air-gap-disconnect RESET button 1204 has a hole 1336, through which a maintenance or service worker can insert a padlock or other locking device to complete a lockout-tagout (LOTO) safety procedure. Completing the LOTO safety procedure ensures that the PD 800 will not be accidentally reset by the maintenance or service worker and will not be inadvertently reset by other persons unaware of the hazard. Once the hazard has been cleared by the maintenance or service worker, the padlock or other locking device can then be removed and the PD 800 can be reset by pressing the air-gap-disconnect RESET button 1204 back into the enclosure. Pushing the air-gap-disconnect RESET button 1204 back into the enclosure forces the electrically conductive male connector blades 1326 to be reinserted into the electrically conductive receptacles 1328 of the female line-to-load connector 1330 and allows the tab 1320 at the end of the holding member 1310 to be reinserted into the slot 1322 in the connector blade holster 1324. Note that the solenoid 1308 has an internal spring that pulls the plunger 1318 back into the solenoid housing shortly after it has been ejected and the air-gap has been formed. Since the holding member 1310 is also attached to the plunger 1318, the tab 1320 at the end of the holding member 1310, when the plunger 1318 is pulled back into the solenoid housing, the holding member 1310 is also pulled back to it normal operating condition position, with the tab 1320 reinserted back into the slot 1322 of the connector blade holster 1324. With the tab 1320 reinserted back into the slot 1322, the holding member 1310 is then able to once again hold the male connector blades 1326 in the receptacles 1328 of the female line-to-load connector 1330 without the retraction springs 1332 pulling the connector blade holster 1324 and attached male connector blades 1326 out of the receptacles 1328. The holding member 1310 will then continue to hold the male connector blades 1326 in the receptacles 1328 until the air-gap disconnect process is once again activated.

In the description above, the air-gap disconnect process is activated automatically upon the sense and drive circuit 816 determining that a fault or other potentially harmful overcurrent condition is present or developing in the load circuit. The PD 800 also provides the ability for a person to manually activate the air-gap disconnect process. This manual control is provided by the OFF button, which is electrically connected to the microcontroller 802. When a person presses the OFF button, the microcontroller 802 responds by sending an electrical pulse to the solenoid 1308 to activate the air-gap disconnect process.

It should be pointed out that because the real-time load current information sensed by the currents sensor 808 in the PD 800 is sent to the PD's microcontroller 802 and not just to the sense and drive circuit 816, the air-gap disconnect unit 818 can still be activated even if the solid-state device 806 should ever fail and even if any component in the fault detection and response circuitry 900 of the sense and drive circuit 816 ever fails. This ability to activate the air-gap disconnect unit 818 independent of the operational status of the solid-state device 806 and independent of the operational status of the fault detection and response circuitry 900 provides a "fail-safe."

Figure 14:
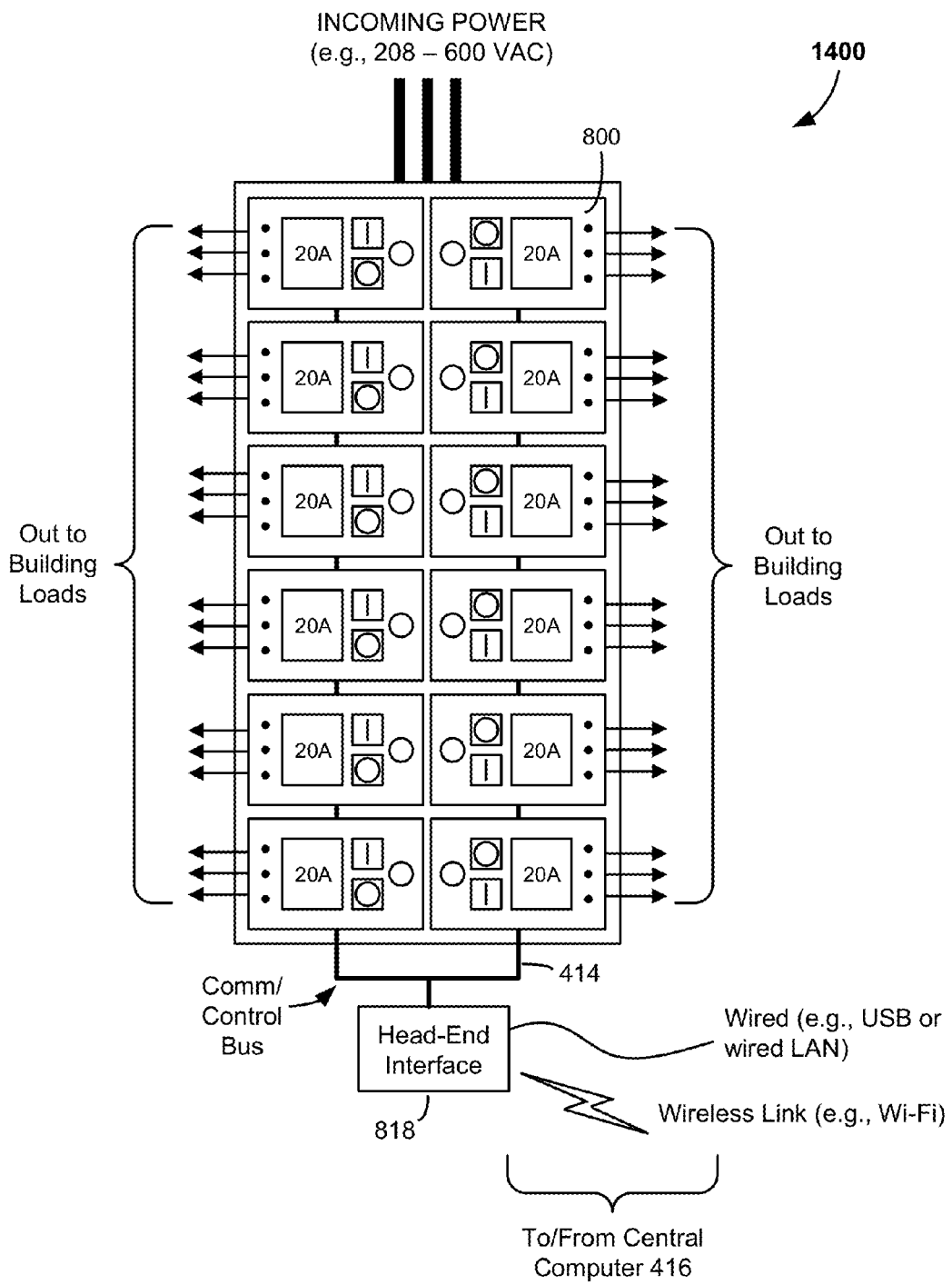
FIG. 14 is a drawing that illustrates how a plurality of PDs like that depicted in FIG. 8 can be deployed and configured in a panelboard, according to one embodiment of the invention.

FIG. 14 is a drawing that illustrates how a plurality of the PDs 800 depicted in FIG. 8 can be deployed and configured in a panelboard 1400, such as, for example, the MDP 402 or one of the sub-panelboards 404 in the dynamically coordinatable electrical distribution system 400 described above in reference to FIG. 4. A power distribution backplane with busbars and/or other electrical conductors are configured to receive AC power from the service drop (e.g., 208 to 600

VAC) and distribute the received AC power to the various PDs 800 in the panelboard 1400. The PDs 800 then distribute the AC power they receive to their respective loads and electrically isolate their respective loads from the AC power they receive when conditions warrant, in the manner described above. The PDs 800 are also electrically connected to the network comm/control bus 414, so that they can communicate with and be controlled by the central computer 416 over the comm/control bus 414, via the head-end interface 418. Note that the head-end interface 418 may include a wired adapter (for example, a USB-CAN bus adapter if the comm/control bus adapter is a CAN bus) or a USB-comm/bus bus dongle that allows the central computer 416 to make a wired connection to the head-end interface 418 and communicate and control the PDs 800 in the panelboard 1400. Alternatively (or additionally) the central computer 416 and head-end interface 418 can be equipped with wireless transceivers (e.g., Wi-Fi transceivers), thereby allowing the central computer 416 to communicate with the comm/control bus 414 and PDs 800 over a wireless link. The head-end interface 418 may also or alternatively include a wide-area-network capable (WAN-capable) adapter that allows the central computer 416 to communicate with and control the PDs 800 over a wide area network (WAN), such as the Internet or a cellular communications network. With this capability, the central computer 416 can then be situated remotely, if necessary or desired and possibly controlled by a utility company.

Figure 15:
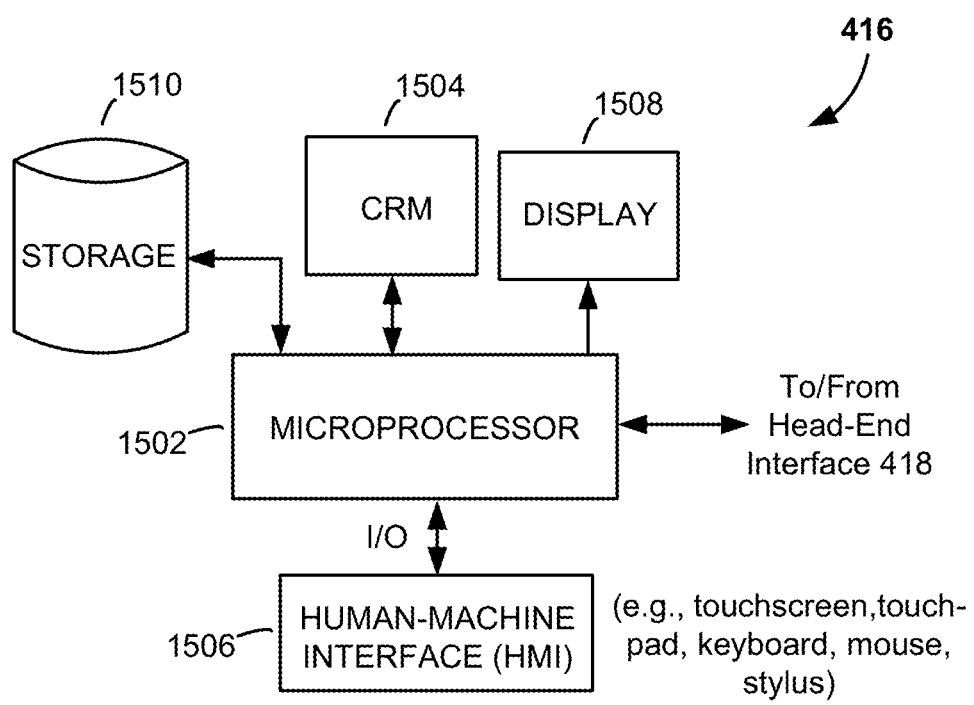
FIG. 15 is a drawing showing the salient elements of the central computer used in the dynamically coordinatable electrical distribution system depicted in FIG. 4.

FIG. 15 is a drawing that shows the salient elements of the central computer 416, which may comprise a server, desktop computer, laptop computer, tablet computer, smartphone, or any other type of computing device. As shown in the drawing, the central computer 416 includes a microprocessor 1502; computer readable memory (CRM) 1504; an optional human-machine interface (HMI) 1506, through which a user can interact with central computer 416; an optional display 1508; and a storage device 1510 (e.g., a magnetic hard drive or a solid-state drive) that may be configured to store, among other things, current and voltage information associated with the PDs 410 (e.g., trip-setting parameters for the PDs 410, historical and/or heuristically-derived time-current information and characteristics of the PDs 414, the electrical distribution system 400 in which the PDs 414 of the system 400 are deployed, etc.).

The non-transitory CRM 1504 of the central computer 416 is configured to store computer program instructions that direct how the microprocessor 1502 of the central computer 416 operates. These computer program instructions may include, but are not limited to: instructions that direct how and when microprocessor 1502 communicates with the PDs over the comm/control bus 414, via the head-end interface 418; instructions that direct how and when the microprocessor 1502 receives or fetches current and/or voltage information; instructions that control how and when the microprocessor 1502 analyzes current and/or voltage information received from the PDs and historical and/or heuristic current and/or voltage information retrieved from storage 1510; instructions that direct how the microprocessor 1502 calculates trip-setting parameters for the PDs to adapt to; and instructions that determine how and when, and under what circumstances, the microprocessor 1502 transmits updated trip-setting parameters to the PDs, in order to dynamically coordinate the PDs in the system 400. Some or all of these operations can be performed in real time, and in most circumstances without disrupting the general operation of the distribution system 400. The real-time capability not only affords the ability to adjust, control and optimize, in real time, the trip settings of the PDs, it also completely eliminates the need for pre-planned or ad hoc selective coordination studies. It also allows higher-level zones or sections of the distribution system 400 that may be operationally important or which may be susceptible or sensitive to sudden increases in current to be closely monitored and dynamically adjusted, if necessary or desired.

Figure 16:
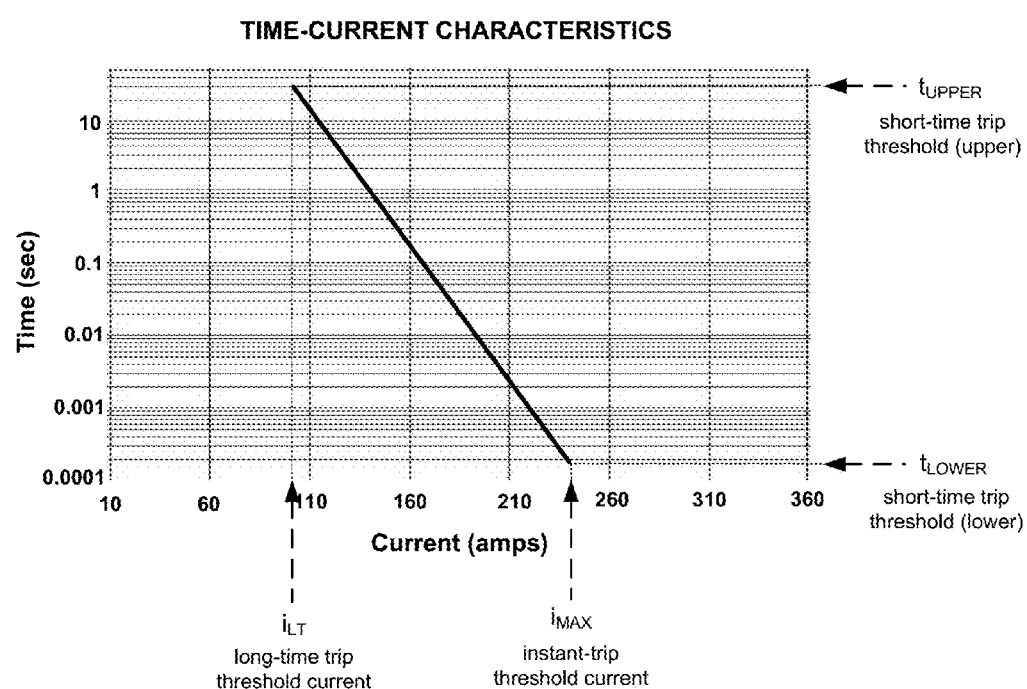
FIG. 16 is a drawing showing the time-current characteristics of a PD like that depicted in FIG. 8, showing the trip-setting parameters $t_{UPPER}$, $t_{LOWER}$, $i_{LT}$, and $i_{MAX}$ of the PD.

How the central computer 416 operates to dynamically coordinate PDs in the electrical distribution system 400 will now be described. Before describing the various operations that the central computer 416 performs in dynamically coordinating the PDs, reference is first made to FIG. 16. FIG. 16 is a drawing shows the time-current characteristic of a PD (assuming a PD constructed like the PD 800 depicted in FIG. 8). The "upper" short-time trip time threshold $t_{UPPER}$ in the time-current characteristics establishes how long the PD 800 will tolerate a load current higher than the long-time trip threshold current $i_{LT}$ before the fault detection and response circuitry 900 of the sense and drive circuit 816 (see FIG. 9) produces a Gating Disable signal to turn OFF the PD's 800's solid-state device 806. The "lower" short-time trip time threshold $t_{LOWER}$ establishes how long the PD 800 will tolerate a load current just below the instant-trip threshold current $i_{MAX}$. Some or all of these "trip-setting parameters," $t_{UPPER}$, $t_{LOWER}$, $i_{LT}$, and $i_{MAX}$ for one or more of the PDs 800 (and also possibly the current rating of one or more of the PDs 800 are transmitted to the microcontrollers 802 of the PDs 800 (over the comm/control bus 414, via the head-end interface 418, prior to or during the dynamic coordination process described in reference to FIG. 18 below.

Figure 17A:
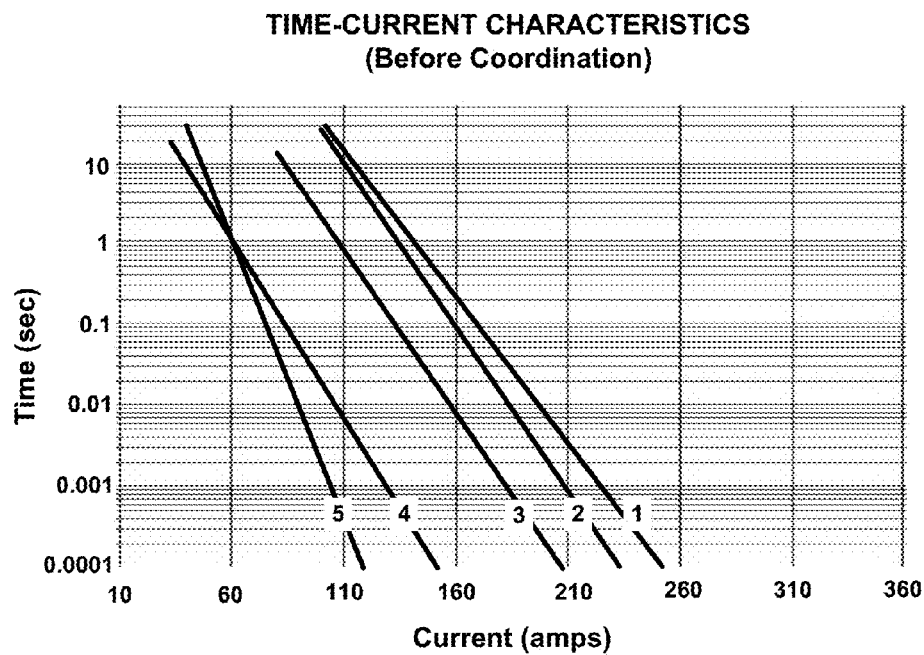
FIG. 17A is a drawing that shows the time-current characteristics of five PDs before being dynamically coordinated.
Figure 17B:
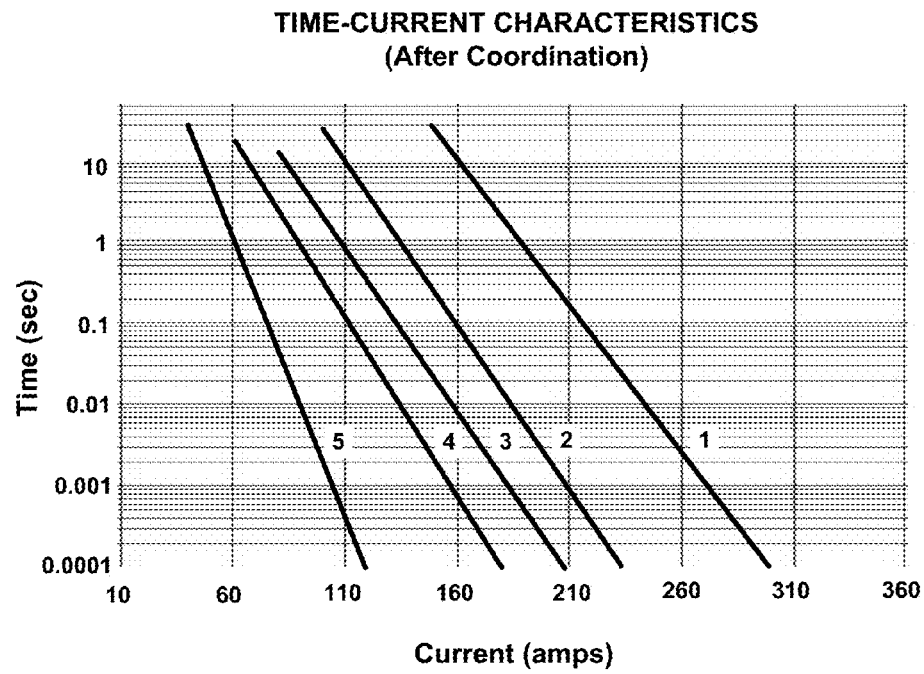
FIG. 17B is a drawing that shows the time-current characteristics of the same five PDs depicted in FIG. 17B, after the PDs have been dynamically coordinated using the methods and apparatus of the present invention.

To better understand what the dynamic coordination of the PDs entails, reference is also made to FIGS. 17A and 17B, which show the time-current characteristics of PDs (labeled "1" through "5") involved in a dynamic coordination. FIG. 17A shows the time-current characteristics of five PDs labeled "1" through "5" before the coordination, and FIG. 17B shows the time-current characteristics of the PDs "1" through "5" after the coordination has been completed. Prior to the coordination being performed (FIG. 17A), the PD 800 labeled with a "1" (which may correspond to the main PD 408 in the MDP 402 in FIG. 4, for example) is seen to have time-current characteristics that are too close to the time-current characteristics of the PD 800 labeled with a "2." Additionally, the time-current characteristics of the PDs 800 labeled "4" and "5" are seen to overlap. Both of these conditions are non-optimal since either can result in one or more of the PDs 800 not tripping when it/they should or can result in one or more of the PDs 800 tripping prematurely when it/they should not. For example the instant-trip threshold current $i_{MAX}$ and long-time trip threshold current $i_{LT}$ settings of the PD 800 labeled with a "1" are both likely too low. Additionally, the instant-trip threshold current $i_{MAX}$ and long-time trip threshold current $i_{LT}$ settings of the PD 800 labeled with a "4" are also too low and/or the instant-trip threshold current $i_{MAX}$ and long-time trip threshold current $i_{LT}$ settings of the PD 800 labeled with a "5" are too high.

Figure 18:
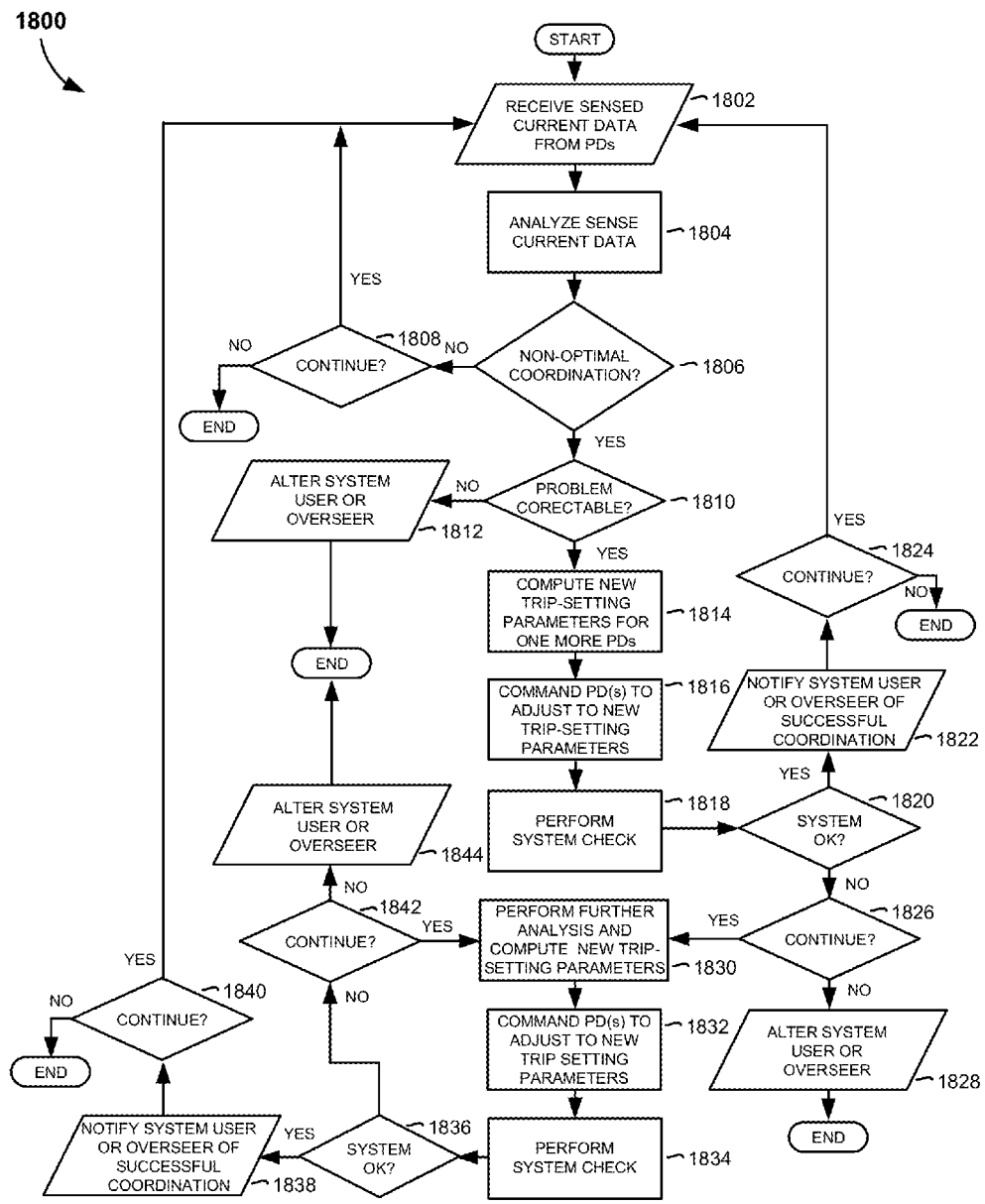
FIG. 18 is a drawing of a flowchart that illustrates a method that the central computer is programmed to follow in dynamically coordinating a plurality of PDs in an electrical distribution system, in accordance with one embodiment of the present invention.

Now that the goal of the dynamic coordination process has been described, reference is made to FIG. 18, which is a flowchart that illustrates one exemplary method 1880 that the microprocessor 1502 of the central computer 416 is programmed to follow in dynamically coordinating a plurality of PDs in an electrical distribution system, in accordance with one embodiment of the invention. First, at step 1802 the central computer 416 receives real-time sensed current data (and possibly measured line voltage information) from one or more of the PDs 800 over the comm/ control bus 414, via the head-end interface 418. At step 1804 the central computer 416 then analyzes the received sensed current data, measured voltage data, and possibly retrieves historical and/or heuristic (i.e., non-real-time) current and/or voltage information stored in the central computer's storage 1510. After analyzing the received sensed current data and possible other date retrieved from the storage 1510, at decision 1806 the central computer 416 determines whether there is a coordination problem or other non-optimal coordination among the various PDs 800 that are being coordinated. If a non-optimal coordination is determined not to be present, at decision 1808 it is determined whether to continue or end the method 1800. If it is determined that the method 1800 should continue, the method 1800 loops back to step 1802. Otherwise, the method 1800 ends. If the central computer 416 determines that the PDs 800 are not optimally coordinated at decision 1806, at decision 1810 the central computer 416 determines whether the non-optimal coordination might be correctable. If the central computer 416 concludes that the non-optimal coordination is not correctable, at step 1812 the central computer 416 alerts the system user or overseer that it is not able to correct the problem and the method 1800 ends. However, if the central computer 416 determines that the non-optimal coordination might be corrected ("YES" at decision 1810), at step 1814 the central computer 416 computes new trip-setting parameters for one or more of the PDs 800. Next, at step 1816 the central computer 416 transmits the new trip-setting parameters to one or more of the PDs 800 (over the comm/control bus 414 and via the head-end interface 418), commanding the one or more PDs 800 to adjust to the newly-computed trip-setting parameters. Once the PDs 800 have adjusted to the new trip-setting parameters, the central computer 416 then performs a system check at step 1818 to determine whether the PDs 800 have been properly coordinated (such as in FIG. 17B above). If at decision 1820 the central computer 416 determines that the PDs 800 have been properly coordinated, at step 1822 the central computer 416 notifies the system user or overseer that the coordination has been successfully completed. As indicated by decision 1824, the method 1800 may then end or it may loop back to step 1802 so that the central computer 416 can monitor the system and re-coordinate in the event that a non-optimal coordination subsequently arises. If at decision 1820 the central computer 416 determines that the coordination was unsuccessful, at decision 1826 it is determined whether to continue with another attempt to coordinate. If "NO," at step 1828 the central computer 416 alerts the system user or overseer that the coordination could not be completed. On the other hand, if the central computer 416 determines at decision 1826 that further adjustment of the trip-setting parameters might possibly help to optimize the coordination among the PDs 800, at step 1830 the central computer performs further analysis and computes new trip-setting parameters for one or more of the PDs 800 once again, and at step 1832 commands the one or more PDs 800 to adjust to the new trip-setting parameters. Once the PDs 800 have adjusted to the new trip-setting parameters, the central computer 416 performs a system check at step 1834 to determine whether the PDs 800 have been properly coordinated. If at decision 1836 it is determined that the coordination has been successfully completed, at step 1838 the central computer 416 notifies the system user or overseer of the successful coordination. Next, as indicated by decision 1840, the method 1800 may then be terminated or may loop back to step 1802 so that the central computer 416 can monitor the system and re-coordinate in the event that a non-optimal coordination arises in the future.

On the other hand, if at decision 1836 the central computer 416 determines that the coordination was unsuccessful, at decision 1842 it is determined whether to continue with another attempt to coordinate. If "NO," at step 1844 the central computer 416 alerts the system user or overseer that the coordination could not be completed and the method 1800 ends. On the other hand, if the central computer 416 determines at decision 1842 that further adjustment of the trip-setting parameters might possibly help to optimize the coordination among the PDs 800, the method continues once again at step 1830. The central computer 416 may then make further attempts to optimize the coordination. If after several attempts, the coordination is determined not to be possible the system user or overseer is notified of the inability to complete the coordination and the method 1800 ends.

In the exemplary method 1800 described above, the central computer 416 is programmed so that it performs the dynamic coordination method 1800 automatically, upon determining that the PDs in the electrical distribution system 400 are not optimally coordinated. The central computer 416 can also be programmed to perform the dynamic coordination method 1800 independent of the operational status of the electrical distribution system, for example, in accordance with a predetermined preventative maintenance schedule. In this manner, the central computer 416 can maintain optimal coordination among the PDs at all times and re-coordinate when necessary, for example to adapt the coordination to changing load conditions.

The central computer 416 can also (or alternatively) be programmed so that it performs the dynamic coordination method 1800 in response to a command received by a user (e.g., a command entered through the HMI 1506 of the central computer 416 by an electrician or other technician) or in response to a command received from the system overseer, who or which may be an electrical utility or other organization or person having the legal authority to initiate the dynamic coordination method 1800. As will be explained below, the central computer 416 can also (or alternatively) be programmed so that a user of the central computer 416 can assist in the coordination and manually adjust or override the trip-setting parameters of PDs being coordinated.

Figure 19:
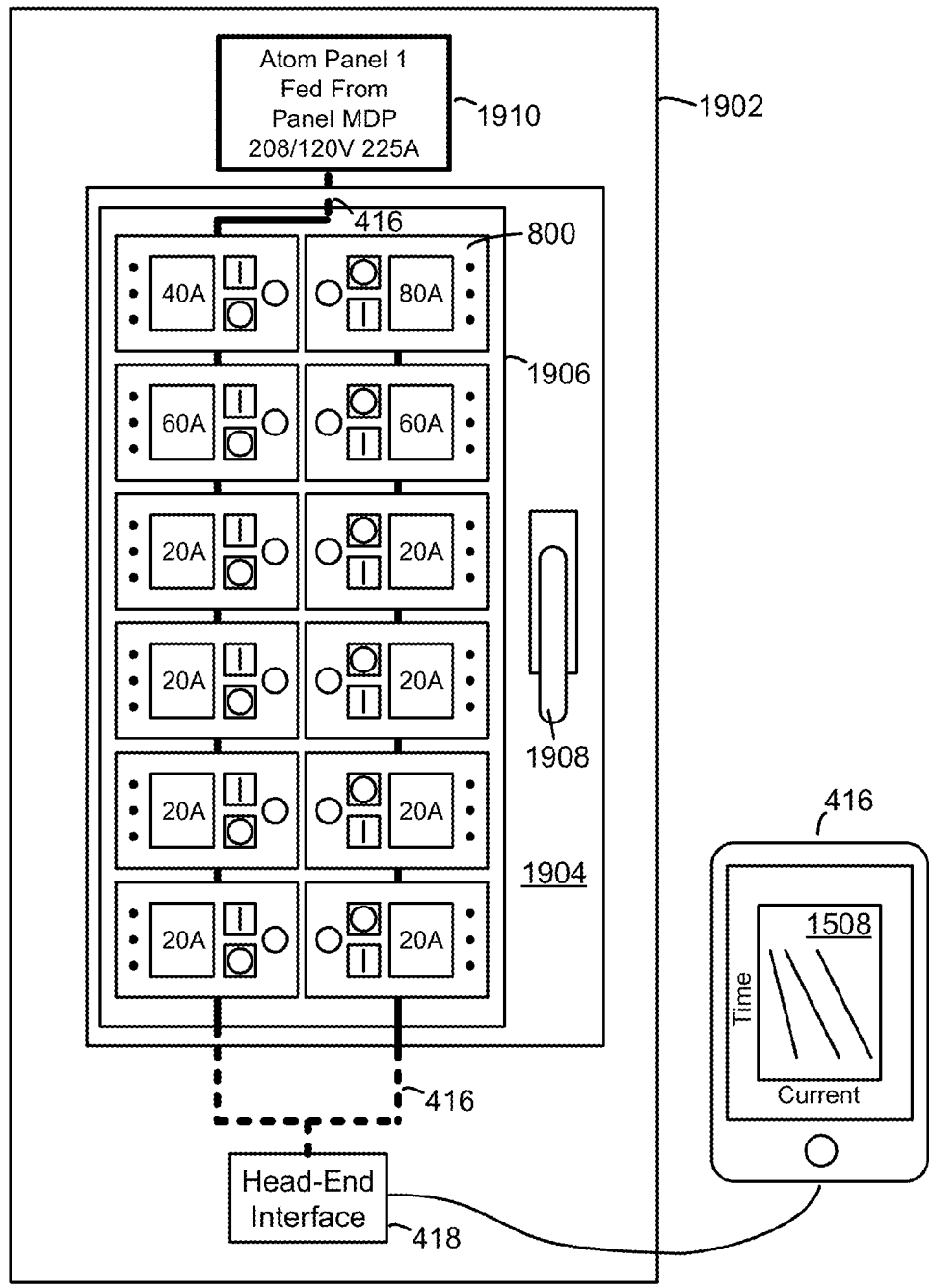
FIG. 19 is a drawing that illustrates how the panelboard depicted FIG. 14 can be housed within a panel box.

FIG. 19 is a drawing that illustrates how the panelboard 1400 depicted FIG. 14 can be housed within a panel box 1902. In one embodiment of the invention the panel box 1902 includes a door 1904 with a window 1906 and a handle or latch 1908 that is used to open and close the door 1904 to access the panelboard 1400, reset tripped PDs 800, and perform maintenance and troubleshooting. The head-end interface 418 between which the comm/control bus 414 and central computer 416 are interfaced may be located inside the panel box 1502, outside the panel box 1902, or at some remote location. Preferably, the head-end interface 418 is located near the panel box 1902, however, so that the central computer 416 can be easily connected to and interfaced with the comm/control bus 414 (e.g., using a USB connector and cable in a situation where the head-end interface 418 includes a USB-comm/control bus adapter) or wirelessly (e.g., in a situation where the central computer 416 and head-end interface 418 are both equipped with wireless transceivers (e.g., Wi-Fi transceivers)).

In one embodiment of the invention the panelboard 1400 is further equipped with a panel display module that is configured so that it is in electrical communication with the comm/control bus 414. As illustrated in FIG. 19, the panel display module includes a panel display 1910, which may be: positioned so that it can be displayed through a cut-out in the front face of the panel box 1902 (as in FIG. 19), located inside the panel box 1902 (e.g., so that it can be viewed through the panel box door window 1906), or mounted outside the panel box 1902 (e.g., affixed to an exterior wall of the panel box 1902). Like the PD displays 514 and 814 of the PDs 500 and 800 described above (see FIGS. 5 and 8), the panel display 1910 is preferably an electronic ink display, so that even when power is removed from the panel display 1901 the information that it displays continues to be displayed. The panel display 1910 may be configured to display any relevant information (real-time or non-real-time) descriptive of the panelboard 1400. For example, in FIG. 19 the panel display 1910 is shown to be displaying the name of the panelboard 1400 ("Atom Panel 1"), the panelboard from which it is fed power ("MDP"), the incoming line voltage ("208/120V"), and the maximum current ("225 A") that the panelboard 1400 is able to supply to the various loads connected to the panelboard 1400.

As alluded to above, the CRM 1504 of the central computer 416 (see FIG. 15) may be configured to store computer program instructions that allow a user of the central computer 416 (e.g., an electrician, engineer or other technician) to interact with the electrical distribution system and its PDs, for example, the panelboard 1400 and the PDs 800 in the panel box 1902. Providing this user-interactive capability allows the user to manually enter, control and even override the trip-setting parameters computed by the central computer 416. In one embodiment of the invention, this user-interactive capability is provided in the form of a graphical user interface (GUI). In accordance with this embodiment of the invention, the computer program instructions stored in the CRM 1504 of the central computer 416 include instructions that direct the microprocessor 1502 of the central computer 416 how to generate one or more GUI pages that are displayed on the central computer's display 1508. Preferably, the display 1508 is equipped with touchscreen technology, which enables the user of the central computer 416 to interact with the GUI pages by touching the screen of the display 1508 or using a stylus. Using simple or multi-touch gesture using one or more fingers, the user can scroll, zoom, input information, etc. and control what GUI pages and content are being displayed on the display 1508. The GUI and display 1508 could alternatively (or additionally) be configured so that the user can interact with the GUI pages and content using a mouse, touchpad, or other non-touchscreen input device. To facilitate user-interactivity, the GUI pages preferably include icons and widgets, such as radio buttons, sliders, spinners, drop-down lists, menus, combo and text boxes, scrollbars, etc.

Figure 20:
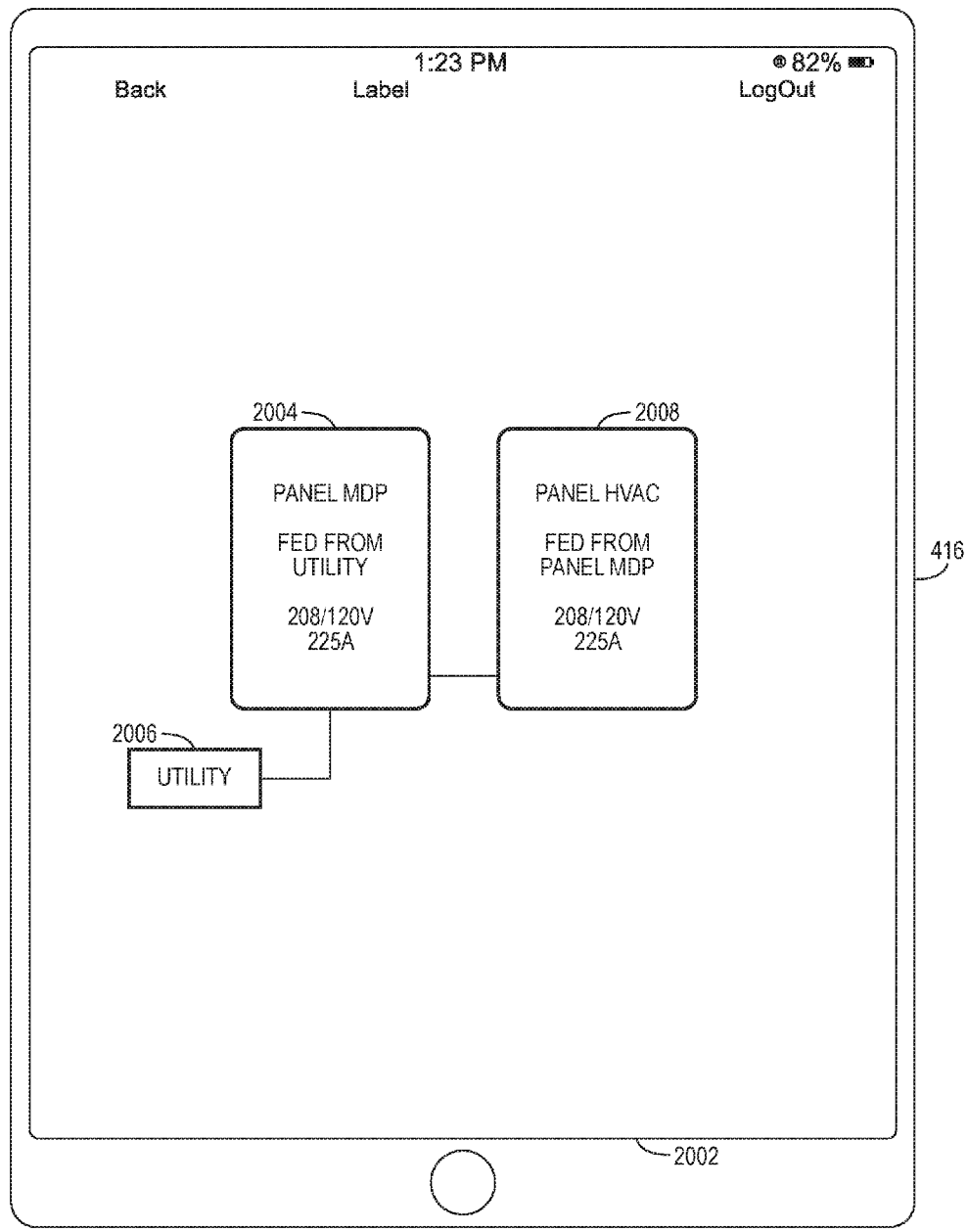

FIG. 20 is a drawing depicting how one of the GUI pages generated by the central computer 416 (which in this case comprises a tablet computer) may comprise a one-line GUI page 2002 that displays the panelboards in an electrical distribution system. The one-line GUI page shows that the electrical distribution system that the tablet computer is connected to (via the comm/control bus 414) comprises an MDP (GUI element 2004 labeled "Panel MDP") fed from an electrical utility (GUI element 2006) and a downstream sub-panelboard (GUI element 2008 labeled "Panel HVAC"). The MDP and sub-panelboard GUI elements 2004 and 2008 further display the line voltages and maximum current that the MDP and sub-panelboard are able to supply to their respective loads.

Figure 21:
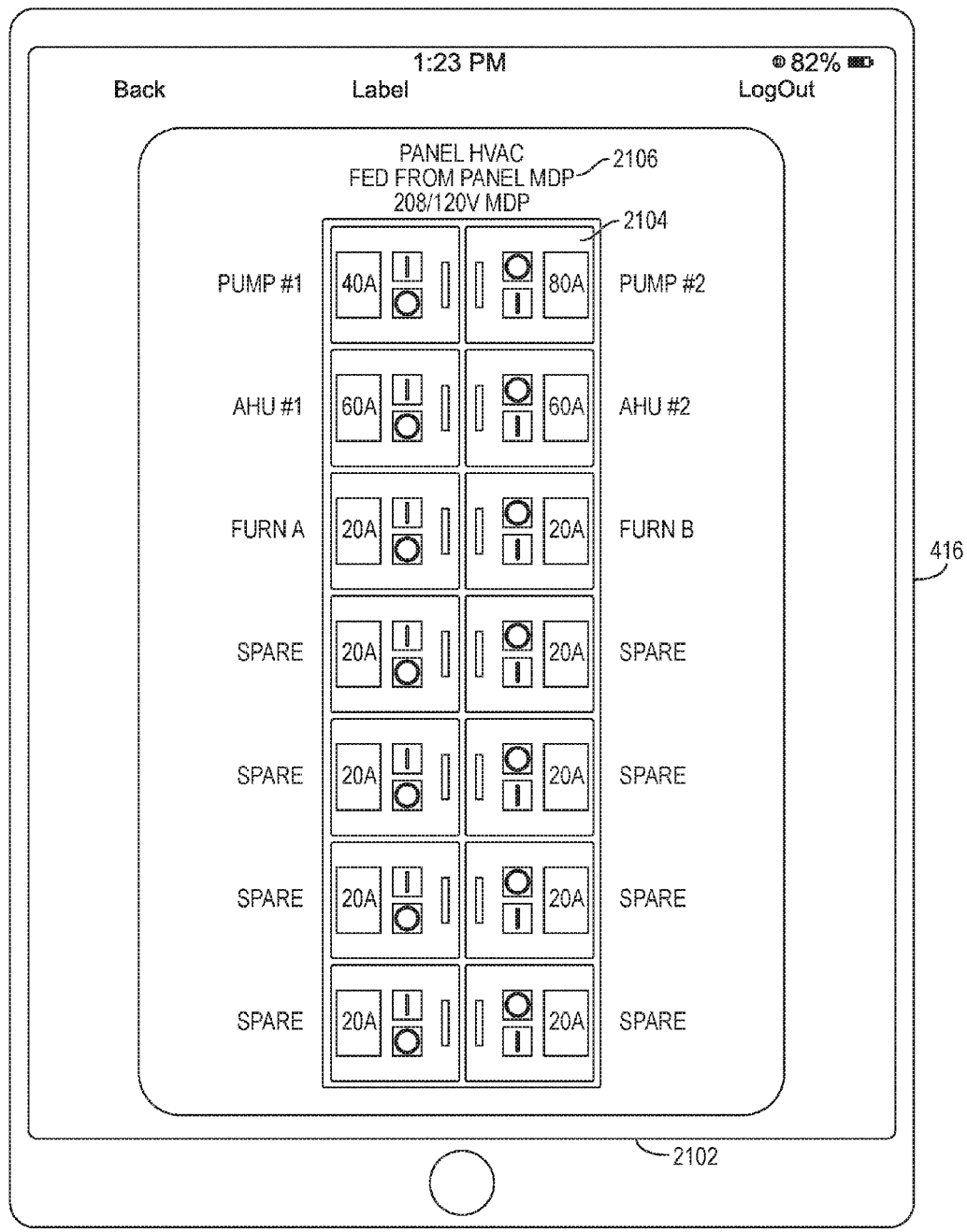

Each of the MDP and sub-panelboard GUI elements 2004 and 2008 in the one-line GUI page shown in FIG. 20 may be a user-interactive button, which the user of the central computer 416 can touch to open a panel GUI page showing how various PDs 800 in the selected MDP or sub-panelboard are configured. FIG. 21 illustrates, for example, a panel GUI page 2102 that is generated by the central computer 416 and displayed on the central computer's display 1508 after the user has touched the sub-panelboard GUI element 2088 in the one-line GUI page 2002. In addition to displaying images 2104 of the various PDs configured in the selected sub-panelboard, the panel GUI page 2102 includes load-name labels that identify the loads being protected by the various PDs in the sub-panelboard. Images of what is presently being displayed on the PDs displays (e.g., PD display 814 in FIG. 12) and on the panel display 1910 (see FIG. 19) may also be displayed in the panel GUI page 2102.

Figure 22:
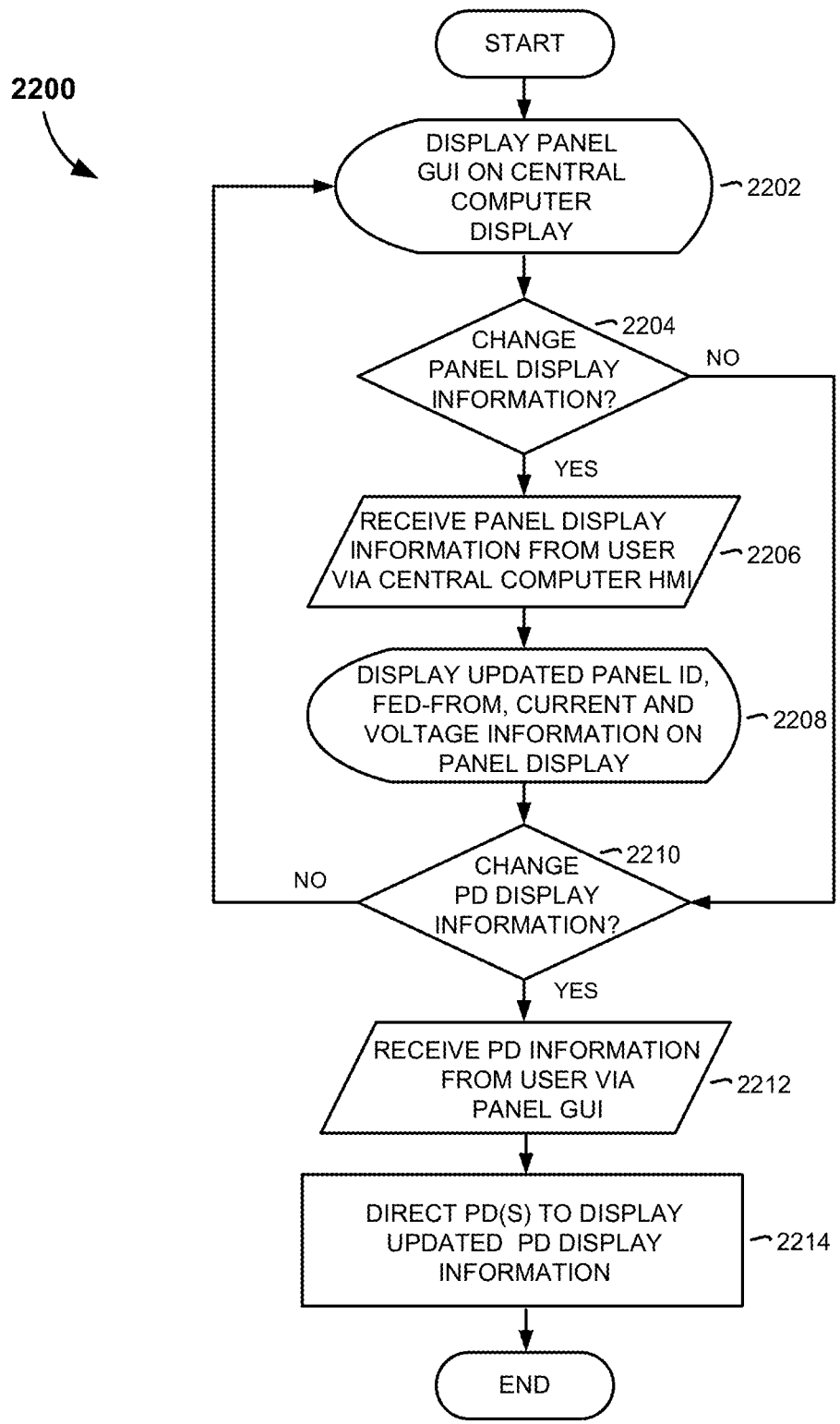
FIG. 22 is a drawing of a flowchart that illustrates a method that the central computer is programmed to follow in allowing the user to update display information being displayed on the displays of the PDs and the panel display.

In accordance with one embodiment of the invention, the GUI computer program instructions stored in the CRM 1504 of the central computer 416 further include user-interactive instructions that provide the user of the central computer 416 the ability to change the information that is displayed by the electronic ink displays of the PDs (e.g., PD display 814 in FIG. 12) and/or the information that is being displayed by the electronic ink panel display 1910 (see FIG. 19). FIG. 22 is a flowchart that illustrates a method 2200 that the central computer 416 is programmed to follow in allowing the user to update this display information. Note that only salient steps in the method 2200 are presented in the flowchart, and the various steps and decisions in the flowchart are not necessarily performed in the order shown or as a sequence of discrete events. For example, some of the steps and decisions may be performed continuously and some of the steps and decisions may be performed simultaneously. First, at step 2202 the central computer 416 directs the display 1508 of the central computer to display the panel GUI page 2102 (FIG. 21) to the user. Next, at decision 2204 the central computer 416 determines whether the user has entered a command indicating that the user wishes to update information being displayed on the panel display 1910. If the central computer 416 determines that the user has input a command to update the information being displayed by the panel display 1910, at step 2206 the central computer 416 then receives updated panel display information from the user. The updated panel display information may be entered by the user using a physical keyboard, if the central computer 416 is equipped with a physical keyboard. Alternatively, the panel display element 2106 in the panel GUI page 2102 (see FIG. 21) can be programmed to serve as a user-interactive button, which when touched by the user opens up a user-interactive text box and virtual keyboard that the user can interact with to enter the user's desired panel display information. After receiving the updated panel display information from the user, the central computer 416 responds at step 2208 by refreshing and updating the panel display 1910 accordingly. At decision 2210 the central computer 416 then determines whether the user has entered a command indicating that the user wishes to update information being displayed by the electronic ink display(s) of one or more of the PDs. If the central computer 416 determines that the user has input a command to update the information being displayed by the electronic ink displays of one or more of the PDs, at step 2212 the central computer 416 then receives the updated PD display information from the user. Again, the updated PD display information may be entered by the user using a physical keyboard, if the central computer 416 is equipped with a physical keyboard. Alternatively, the PD images 2104 displayed on the panel GUI page 2102 (see FIG. 21) can be programmed to serve as user-interactive buttons, which when touched by the user opens up a user-interactive text box and virtual keyboard that the user can interact with to enter the updated PD display information for the one or more PDs. Finally, after receiving the updated PD display information, at step 2214 the central computer communicates the updated PD display information to the appropriate microcontrollers 802 of the PDs (over the comm/control bus and via the head-end interface 418), so that the microcontrollers 802 can then update their electronic ink displays accordingly. (Note if the names of any of the loads of any of the PD electronic displays have been updated, the central computer 416 automatically updates the load-name labels next to the corresponding images 2104 of the PDs in the panel GUI page (see FIG. 21).)

Figure 23:
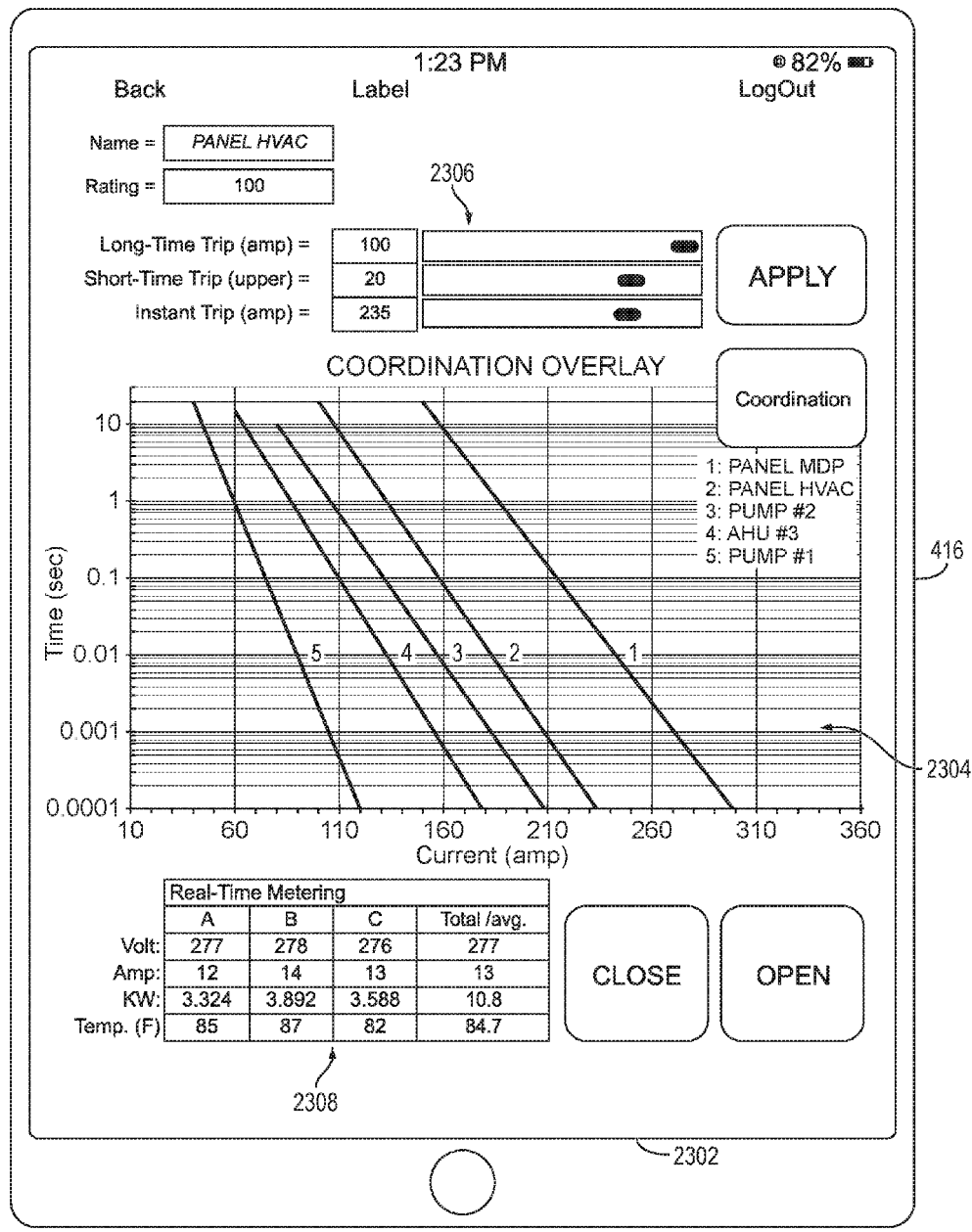
FIG. 23 is a drawing depicting a dynamic coordination GUI page that is displayed on the display of the central computer (in this case, a touchscreen display of a tablet computer) and that a user can interact with to assist in dynamically coordinating a plurality of PDs in an electrical distribution system.

In the exemplary dynamic coordination method 1900 described above (see FIG. 19 and accompanying description), the central computer 416 is programmed so that it dynamically coordinates PDs in an electrical distribution system automatically, i.e., without the need for any user assistance. In some circumstances, for example, if the central computer 416 is unable to complete a successful coordination, it may be desirable or necessary for an electrician, engineer or other technician to manually coordinate the PDs or override the trip-setting parameters that the central computer 416 computes, in order to complete a successful coordination. To support this 'user-assisted' dynamic coordination, the GUI program instructions stored in the central computer's CRM 1504 and executed by the microprocessor 1502 of the central computer 416 may further include instructions that direct the central computer 416 to generate and display a dynamic coordination GUI page 2302, such as illustrated in FIG. 23. The dynamic coordination GUI page 2302 preferably includes a time-current coordination overlay 2304 that displays the time-current characteristics of the PDs being manually coordinated. In the exemplary dynamic coordination overlay 2304 shown in FIG. 23, time-current characteristics of five PDs are shown. The five PDs are labeled "1," "2," "3," "4" and "5." However, in a preferred embodiment, each of the time-current characteristic lines has a unique color, so that they are distinguished by different colors rather than by numbers, and the legend in the coordination overlay 2304 that identifies the time-current characteristic lines also uses corresponding and matching colors. Each of the time-current characteristic lines also serves as a user-interactive button, which when touched by the user causes the central computer 416 to display the trip-setting parameters of the selected PD on the dynamic coordination GUI page 2302, including the long-time trip threshold long-time trip threshold current $i_{LT}$, short-time trip time threshold $t_{UPPER}$, and instant-trip threshold current $i_{MAX}$ (see FIG. 16). In the snapshot of the dynamic coordination GUI page 2302 shown in FIG. 23, the PD that is selected is PD #2, which is the main PD in a panelboard having the name "Panel HVAC," as shown in the text box with the label "Name=" in the upper left corner of the dynamic coordination GUI page 2302. The dynamic coordination GUI page 2302 further includes sliders 2306 that the user can touch and slide to manually change the long-time trip threshold current $i_{LT}$, short-time trip time threshold $t_{UPPER}$, and instant-trip threshold current $i_{MAX}$ of the selected PD. (Although not shown, a slider can also be included for adjusting the short-time trip time threshold $t_{LOWER}$.) Further displayed on the dynamic coordination GUI page 2302 is the current rating of the selected PD. As shown, the PD that is currently selected has a current rating of 100 A. Note that the Name and Rating of the selected PD can also be changed by entering the desired change in Name and/or Rating in the text boxes with the "Name=" and "Rating=" labels. Also included in the dynamic coordination GUI page 2302 is a table 2308 that displays real-time metering information of the selected PD, including real-time voltage, real-time amperage, real-time kilowatts and real-time temperature. Finally, the dynamic coordination GUI page 2302 includes user-interactive "CLOSE," "OPEN," "COORDINATION" and "APPLY" buttons. The "OPEN" and "CLOSE" buttons are user-interactive buttons that allow the user to remotely deactivate (i.e., turn OFF) the solid-state device of the selected PD (to "open" the selected PD's load circuit) and remotely activate (i.e., turn ON) the solid-state device of the selected PD (to "close" the selected PD's load circuit). The "APPLY" button is a user-interactive button that is used by the user to direct the central computer to apply any changes the user has entered through the dynamic coordination GUI page 2302, including any changes made to the trip-setting parameters of a selected PD via the sliders 2306, any changes the user has entered in the "Name=" and "Rating=" text boxes of a selected PD, etc. Finally, the "COORDINATE" button is a user-interactive button that is used by the user to request the central computer to coordinate the various PDs represented in the coordination overlay 2304, once the user has completed individually adjusting the trip-setting parameters of one or more of the PDs.

Figure 24:
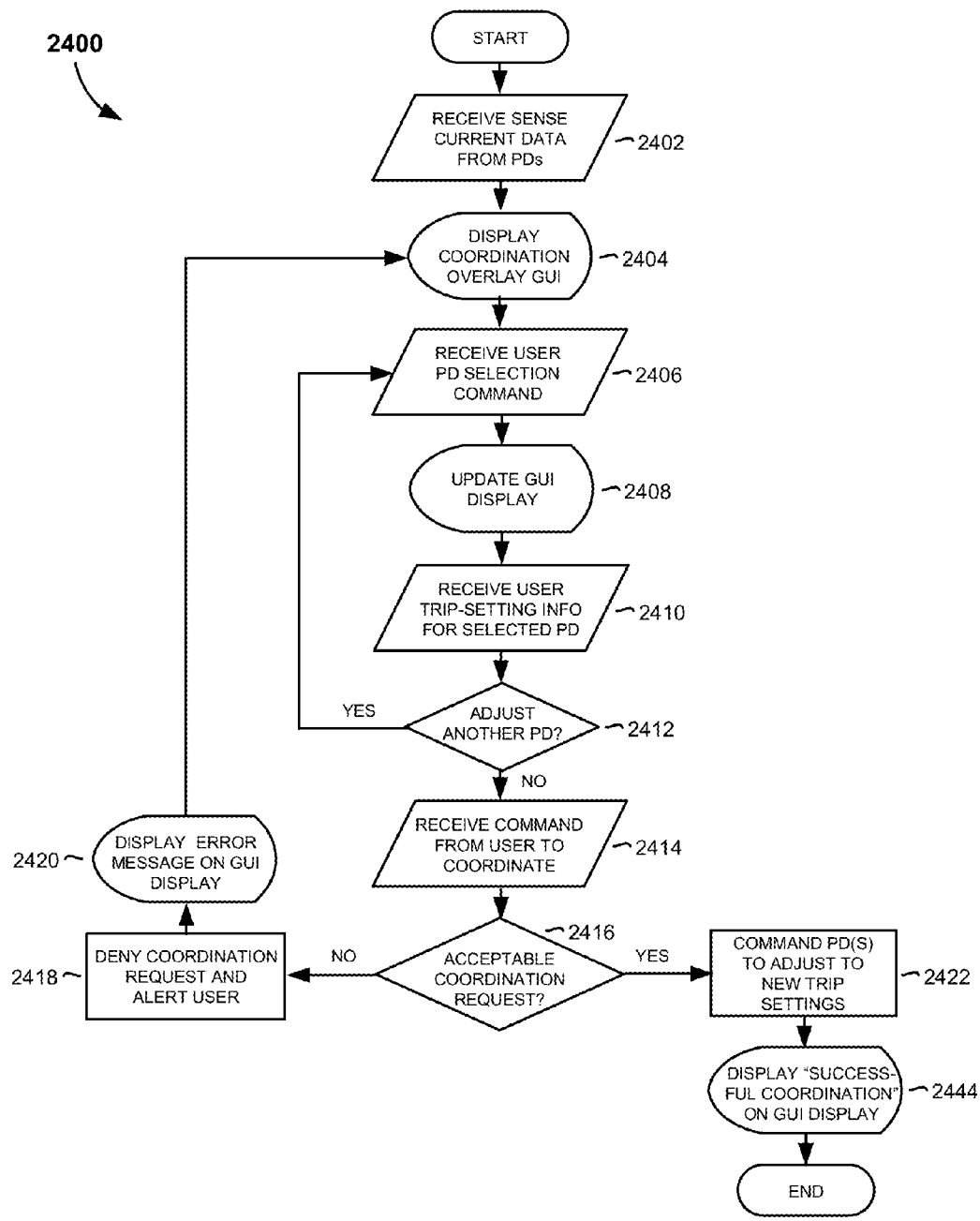
FIG. 24 is a drawing of a flowchart that illustrates a method that the central computer performs when a user is interacting with the dynamic coordination GUI page that is displayed on the display of the central computer (in this case, a touchscreen display of a tablet computer) and that a user can interact with to manually coordinate a plurality of PDs in an electrical distribution system.

FIG. 24 is a flowchart that illustrates a method 2400 the central computer 416 performs when a user is interacting with the dynamic coordination GUI page 2302 to manually coordinate a plurality of PDs. Note that the steps and decisions represented in the flowchart are not necessarily performed in the order shown, and some steps and decisions may be performed continuously or simultaneously, as will be appreciated by those of ordinary skill in the art. At step 2402 in the method 2400 the central computer 416 receives real-time sense current data (and possibly also real-time voltage information) from the PDs that are being coordinated. After receiving the current and/or voltage information from the PDs, at step 2404 the central computer generates and displays the dynamic coordination GUI page 2302 on its display 1508, including the time-current characteristics of all PDs that are going to be manually coordinated and some or all of the other elements and controls of the exemplary dynamic coordination GUI page 2302 depicted in FIG. 23. (Note that in displaying the time-current characteristics the trip-setting parameters of the various PDs are also received from the PDs or are retrieved from the storage unit 1510.) Next, at step 2406 the central computer 416 receives a command from the user indicating that the user has selected one of the PDs for adjustment. Responding to the user command, at step 2408 the central computer 416 then updates the dynamic coordination GUI page 2302 so that the Name, Rating, trip-setting parameters of the selected PD (long-time trip threshold long-time trip threshold current $i_{LT}$, short-time trip time threshold $t_{UPPER}$, and instant-trip threshold current $i_{MAX}$), and real-time metering table 2308 are displayed. Next, at step 2410 the central computer 2410 receives updated trip-setting parameters from the user, which the user inputs by adjusting the sliders 2306 of the selected PD and commands the central computer to accept by touching the "APPLY" button. At decision 2412 the central computer then determines whether the user has selected another PD to adjust. If "YES" the method 2400 loops back to step 2406 where the central computer 416 waits to receive PD selection and trip-setting parameter adjustments for other of the PDs in the coordination overlay 2304. After all trip-setting adjustments have been input by the user, the user then touches the "COORDINATE" button, requesting that the central computer 416 coordinate the PDs accordingly. After receiving the COORDINATION request, at step 2414 the central computer 416 determines at decision 2416 whether the user's coordination request might pose a hazard or other problem. If a hazard or other problem might possibly occur if the coordination is made as directed by the user, at step 2418 the coordination request is denied, and at step 2420 the central computer presents an error message on the dynamic coordination GUI page 2302 (and possibly alerts the user with an audible warning) that the coordination request could not be accepted. If, on the other hand, the central computer 416 determines that the coordination request is acceptable, at step 2422 the central computer 416 transmits (over the comm/control bus 414 and via the head-end interface 418) the user-set trip-setting parameters to the PDs that are being coordinated. Finally, after the PDs have adjusted to the user-set trip-setting parameters, at step 2444 the central computer 416 updates the coordination overlay 2304 image on the dynamic coordination GUI page 2302 and displays a message to the user that the coordination has been successfully completed.

While various embodiments of the present invention have been described, they have been presented by way of example and not limitation. It will be apparent to persons skilled in the relevant art that various changes in form and detail may be made to the exemplary embodiments without departing from the true spirit and scope of the invention. Accordingly, the scope of the invention should not be limited by the specifics of the exemplary embodiments but, instead, should be determined by the appended claims, including the full scope of equivalents to which such claims are entitled.

The invention claimed is:

1. A method of dynamically coordinating a plurality of protection devices (PDs), each PD having a solid-state device through which an associated load current flows, a microcontroller configured to control the solid-state device and a current sensor, in an electrical distribution system, comprising:

directing each microcontroller in the plurality of PDs to control their respective solid-state devices to operate in accordance with a plurality of initial trip settings;

measuring a plurality of currents passing through the respective solid-state devices of the plurality of PDs using each associated current sensor;

determining, based on the plurality of measured currents, whether time-current characteristics of any two or more of the plurality of PDs overlap;

automatically directing one or more microcontrollers in one or more of the PDs to adjust the initial trip settings that their respective solid-state devices are being controlled to operate in accordance with, if it is determined that the time-current characteristics of any two or more of the plurality of PDs overlap, so the time-current characteristics no longer overlap and the plurality of PDs are optimally coordinated;

generating and displaying an image of the time-current characteristics of any one or more of the PDs on a user-interactive graphical user interface (GUI) of a computing device that communicates with and controls the microcontrollers in the plurality of PDs, the user-interactive GUI including user-interactive controls that a user further manipulates to modify the adjusted initial trip settings the solid-state devices in the plurality of PDs are being controlled to operate in accordance with;

receiving a command from a user, via the user-interactive GUI, to change the adjusted initial trip settings of one or more solid-state devices in one or more of the PDs are being controlled to operate in accordance with;

modifying the adjusted initial trip settings of the one or more solid-state devices in the one or more PDs in response to the user's command; and generating and displaying on the user-interactive GUI of the computing device an updated image of the time-current characteristics of one or more of the PDs, after the adjusted initial trip settings have been changed in response to the user's command.

2. The method of claim 1, wherein each of the PDs includes an electronic display, and the method further comprises:

generating and displaying images representative of one or more of the PDs and their respective electronic displays on the user-interactive GUI, the user-interactive GUI including user-interactive controls the user manipulates to change information displayed on the electronic displays of the plurality of PDs;

changing the information that is displayed on the respective electronic displays of the one or more PDs, in response to a command from the user via the user-interactive GUI to change the information displayed on the respective electronic displays; and generating and displaying on the user-interactive GUI of the computing device updated images representative of the one or more PDs and their respective electronic displays, after information displayed on the respective electronic displays of the one or more PDs has been changed in response to the user's command.

3. The method of claim 1, wherein some or all of the plurality of PDs are electrically configured in a panelboard having an electronic panel display, and the method further comprises:

generating and displaying an image of information that is displayed on the electronic panel display on the user-interactive GUI, the user-interactive GUI including user-interactive controls that the user manipulates to change the information displayed on the electronic panel display;

changing the information displayed on the electronic panel display, in response to a command from the user via the user-interactive GUI to change the information displayed on the electronic panel display; and generating and displaying on the user-interactive GUI of the computing device an updated image of information displayed on the electronic panel display, after the information displayed on the electronic panel display has been changed in response to the user's command.

* * * * *